United States Patent
Sukigara et al.

(10) Patent No.: US 7,765,601 B2
(45) Date of Patent: Jul. 27, 2010

(54) SYSTEM FOR PROCESSING INFORMATION, DEVICE FOR PROCESSING INFORMATION, AND PROGRAM

(75) Inventors: Ryu Sukigara, Kanagawa (JP); Akio Koresawa, Kanagawa (JP); Yoichi Ohshige, Kanagawa (JP); Takashi Takeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1243 days.

(21) Appl. No.: 11/165,219

(22) Filed: Jun. 24, 2005

(65) Prior Publication Data
US 2006/0005261 A1 Jan. 5, 2006

(30) Foreign Application Priority Data
Jul. 1, 2004 (JP) .................... P2004-195221

(51) Int. Cl.
*G06F 7/04* (2006.01)
(52) U.S. Cl. .................... 726/27; 726/26; 705/59
(58) Field of Classification Search .............. 726/27
See application file for complete search history.

(56) References Cited

U.S. PATENT DOCUMENTS

2005/0122841 A1* 6/2005 Yanase .................... 368/10
2006/0008256 A1* 1/2006 Khedouri et al. .......... 386/124
2008/0305738 A1* 12/2008 Khedouri et al. ......... 455/3.06

FOREIGN PATENT DOCUMENTS

| JP | 2001265662 A | * | 9/2001 |
| JP | 2001356966 A | * | 12/2001 |
| JP | 2005165179 A | * | 6/2005 |

\* cited by examiner

*Primary Examiner*—Jung Kim
*Assistant Examiner*—Samson B Lemma
(74) *Attorney, Agent, or Firm*—Oblon, Spivak, McClelland, Maier & Neustadt, L.L.P.

(57) ABSTRACT

An information processing system including: first and second information processing devices in communication through a network. The first device has a license information-sending unit that sends license information containing utilizing-time limit information for utilizing a content in response to a request from the second device. The second device has: a license information-receiving unit that receives the license information sent by the license information-sending unit; a time information acquisition unit that acquires time information through the network; an internal clock-setting unit that refers to the time information acquired by the time information acquisition unit to set time information of a built-in internal clock; and a utilization-controlling unit that controls utilization of the content in association with the license information received by the license information-receiving unit based on the time information of the internal clock set by the internal clock-setting unit or a counter working independently of the internal clock.

5 Claims, 16 Drawing Sheets

| TITLE OF CONTENTS | EXPIRING DATE | WATCHING-AND-LISTENING FLAG |
|---|---|---|
| SUPPAINA-MAN | 2004/5/25 12:00 | WATCHING- AND/OR LISTENING- UNAUTHORIZED |
| CUTICLE BUNNY | 2004/5/26 21:00 | WATCHING- AND/OR LISTENING- AUTHORIZED |

SYSTEM FOR PROCESSING INFORMATION, DEVICE FOR PROCESSING INFORMATION, AND PROGRAM

CROSS REFERENCES TO RELATED APPLICATIONS

The present invention contains subject matter related to Japanese Patent Application JP 2004-195221 filed in the Japanese Patent Office on Jul. 1, 2004, the entire contents of which being incorporated herein by reference.

BACKGROUND OF THE INVENTION

1. Field of the Invention

The present invention relates to a system for processing information, a device for processing information, and a program. More specifically, it relates to a system for processing information, a device for processing information, and a program, which are arranged so as to inhibit the illegal extension of a utilizing-time limit.

2. Description of the Related Art

In a system that distributes or delivers contents of an image, music, etc. requiring copyright protection through recording media such as an optical disk or a communication path such as a network to play the contents for users, the contents are made to have a watching-and-listening expiry date until which the contents can be reproduced and watched and/or listened to. Thus, the copyright of the contents is protected, and the contents are distributed and delivered to users at a reasonable price.

The judgment of whether it is past the watching-and-listening expiry date has been often relegated to a user. In some cases, a user tried to watch and/or listen to contents, but he or she couldn't do so because it was past the watching-and-listening expiry date.

On that account, a system in which a server manages the watching-and-listening expiry date of contents has been proposed. For example, JP-A-2003-157335 proposes a management device that makes a server manage the dates remaining before the watching-and-listening expiry date, and notifies a user terminal when the remainder reduces below a given level.

However, such server-exclusive management increases a load on the server and requires connection to a network as indispensable. In contrast, in the case of exclusive management by a user terminal, there is a problem such that when a user doctors the time of an internal clock of his or her terminal to extend the watching-and-listening expiry date, the user can commit an injustice such as watching and/or listening to the contents even after the actual expiry date.

As a countermeasure with respect to the foregoing, JP-A-2003-256062 proposes a utilizing-time limit management system in which the watching-and-listening expiry date of a downloaded application is managed by not only a server but also a user terminal, for example.

In the utilizing-time limit management system, the time of the internal clock of the terminal is made to coincide with that of the server by a server control file, whereby the time of the internal clock of the terminal is inhibited from being doctored.

SUMMARY

However, even if the time of the internal clock of the terminal is made to coincide with that of the server by the server control file, it is still a problem that the time of the internal clock can be doctored before starting the downloaded application and therefore the watching-and-listening expiry date can be illegally extended.

Incidentally, in JP-A-2003-256062, the following measure is taken. That is, the last starting date and time is stored in the application, and the last starting date and time is compared with the date and time of the present starting. Then, if the present starting date and time is prior to the last starting date and time, the start of the application is inhibited. However, in this case, it is required that all the applications subjected to the delivery support the function of storing the last starting date and time, and therefore it is troublesome to make the applications support the function. This poses a problem. Further, the time of the internal clock of the terminal remains doctored until a user corrects the time and as such, when the application to be started is a conventional application that doesn't support the function of storing the last starting date and time, the application is started. This is another problem.

The invention was made in consideration of the foregoing situations. The inventors have recognized that there is a need for inhibiting illegal utilization of contents owing to doctoring an internal clock.

According to an embodiment of the invention, there is provided an information processing system including: a first information processing device; and a second processing device, the first information processing device having a license information-sending unit operable to send a piece of license information containing a piece of utilizing-time limit information for utilizing a content in response to a request from the second information processing device; and the second information processing device having a license information-receiving unit operable to receive the license information sent by the license information-sending unit, a time information acquisition unit operable to acquire a piece of time information through the network, an internal clock-setting unit operable to refer to the time information acquired by the time information acquisition unit and to set a piece of time information of a built-in internal clock, and a utilization-controlling unit operable to control the utilization of a content that the license information received by the license information-receiving unit targets, based on the time information of the internal clock set by the internal clock-setting unit and a piece of time information of a counter working independently of the internal clock.

According to an embodiment of the invention, there is provided a first information processing device including:

a license information-receiving unit operable to receive a piece of license information containing a piece of utilizing-time limit information for utilizing a content from a different information processing device;

a time information acquisition unit operable to acquire a time information through a network;

an internal clock-setting unit operable to refer to the time information acquired by the time information acquisition unit and to set a piece of time information of a built-in internal clock; and a utilization-controlling unit operable to control utilization of the content that the license information received by the license information-receiving unit targets, based on the time information of the internal clock set by the internal clock-setting unit and a piece of time information of a counter working independently of the internal clock.

The first information processing device may further include:

a time-judging unit operable to judge whether or not the time information of the internal clock is faster than that of the counter; and a counter-setting unit operable to set the time information of the counter so as to coincide with the time information of the internal clock when the time-judging unit judges that the time information of the internal clock is faster than that of the counter.

The first information processing device may further include: a counter-setting unit operable to refer to the time information acquired by the time information acquisition unit and to set the time information of the counter.

The first information processing device may further include: a flag-checking unit operable to check a contents playback-authorizing flag showing that the content is available, when utilization of the content is directed, the contents playback-authorizing flag managed by the different information processing device, wherein when it is recognized by the flag-checking unit that the contents playback-authorizing flag is not present, the utilization-controlling unit exercises control to forbid utilization of the content.

In the first information processing device, the license information may contain a utilizing-limit datum for the case of utilizing the content offline. In addition, the first information processing device may further include:

a number-of-utilizations-counting unit operable to count a number of times that the content is utilized when the utilization-controlling unit controls offline utilization of the content; and a utilizing-limit-judging unit operable to judge whether or not the number of utilizations of the content counted by the number-of-utilizations-counting unit is equal to or less than the utilizing-limit datum when the offline utilization of the content is directed, the utilization-controlling unit exercising control to forbid the offline utilization of the content when the utilizing-limit-judging unit judges that the number of utilizations of the content is above the utilizing-limit datum.

The number-of-utilizations-counting unit may reset the number of utilizations of the content when the contents playback-authorizing flag is recognized by the flag-checking unit.

According to an embodiment of the invention, there is provided a first program including:

a license information-receiving step of receiving a piece of license information containing a piece of utilizing-time limit information for utilizing a content from an information processing device;

a time information-acquiring step of acquiring a piece of time information through the network;

an internal clock-setting step of referring to the time information acquired according to the process of the time information-acquiring step and then setting a piece of time information of a built-in internal clock; and a utilization-controlling step of controlling utilization of the content that the license information received according to the process of the license information-receiving step targets, based on the time information of the internal clock set according to the process of the internal clock-setting step and a piece of time information of a counter working independently of the internal clock.

According to an embodiment of the invention, there is provided a second information processing device, including:

a license information-sending unit operable to send a piece of license information containing a piece of utilizing-time limit information for utilizing a content in response to a request from a different information processing device;

a flag-setting unit operable to set, for each user, a contents playback-authorizing flag showing that the content is available, the contents playback-authorizing flag checked by the different information processing device when the content corresponding to the license information sent by the license information-sending unit is utilized, and a flag-disabling unit operable to disable the setting of the contents playback-authorizing flag made by the flag-setting unit based on the utilizing-time limit information contained by the license information.

The license information may contain a utilizing-limit datum for the case of utilizing the content offline.

According to an embodiment of the invention, there is provided a second program including:

a license information-sending step of sending a piece of license information containing a piece of utilizing-time limit information for utilizing a content in response to a request from an information processing device;

a flag-setting step of setting, for each user, a contents playback-authorizing flag showing that the content is available, the contents playback-authorizing flag checked by the information processing device when the content corresponding to the license information sent according to the process of the license information-sending step is utilized, and a flag-disabling step of disabling the setting of the contents playback-authorizing flag made according to the process of the flag-setting step, based on the utilizing-time limit information contained by the license information.

According to the first subject matter of the invention, the first information processing device sends a piece of license information containing a piece of utilizing-time limit information for utilizing a content, in response to a request from the second information processing device. The second information processing device receives the license information from the first device for processing information, acquires a piece of time information through the network, and refers to the acquired time information to set the time information of the built-in internal clock. Then, based on the set time information of the internal clock or the time information of a counter working independently of the internal clock, utilization of the content that the received piece of license information targets is controlled.

According to the second subject matter of the invention, a piece of license information containing a piece of utilizing-time limit information for utilizing a content is received from an information processing device; the time information is received through the network; and the time information of the built-in internal clock is set in reference to the acquired time information. Based on the set time information of the internal clock or the time information of a counter working independently of the internal clock, utilization of the content that the received piece of license information targets is controlled.

According to the third subject matter of the invention, a piece of license information containing a piece of utilizing-time limit information for utilizing a content is sent in response to a request from the information processing device. In addition, a contents playback-authorizing flag showing that the content is available is set for each user, provided that the contents playback-authorizing flag is checked by the information processing device when the content corresponding to the sent piece of license information is utilized. Then, the setting of the contents playback-authorizing flag is disabled based on the utilizing-time limit information that the license information contains.

"Network" means a mechanism to which at least two devices are connected, and in which a piece of information can be transmitted from a device to another. The devices that establish communication through the network may be separate from one another, or may be internal blocks that constitute one machine.

"Communication" may represent either radio communication and wire communication naturally. However, it may be the communication with radio and wire communications intermingled, and more specifically, communication such that radio communication is adopted in a certain segment and wire communication is adopted in another segment. Also, it may be the communication such that the communication from a device toward another device is by wire and the communication in the reverse direction is by radio.

According to the invention, illegal extension of valid term of license can be inhibited. Also, the invention can promote copyright protection more readily.

EMBODIMENTS

Figure 1:
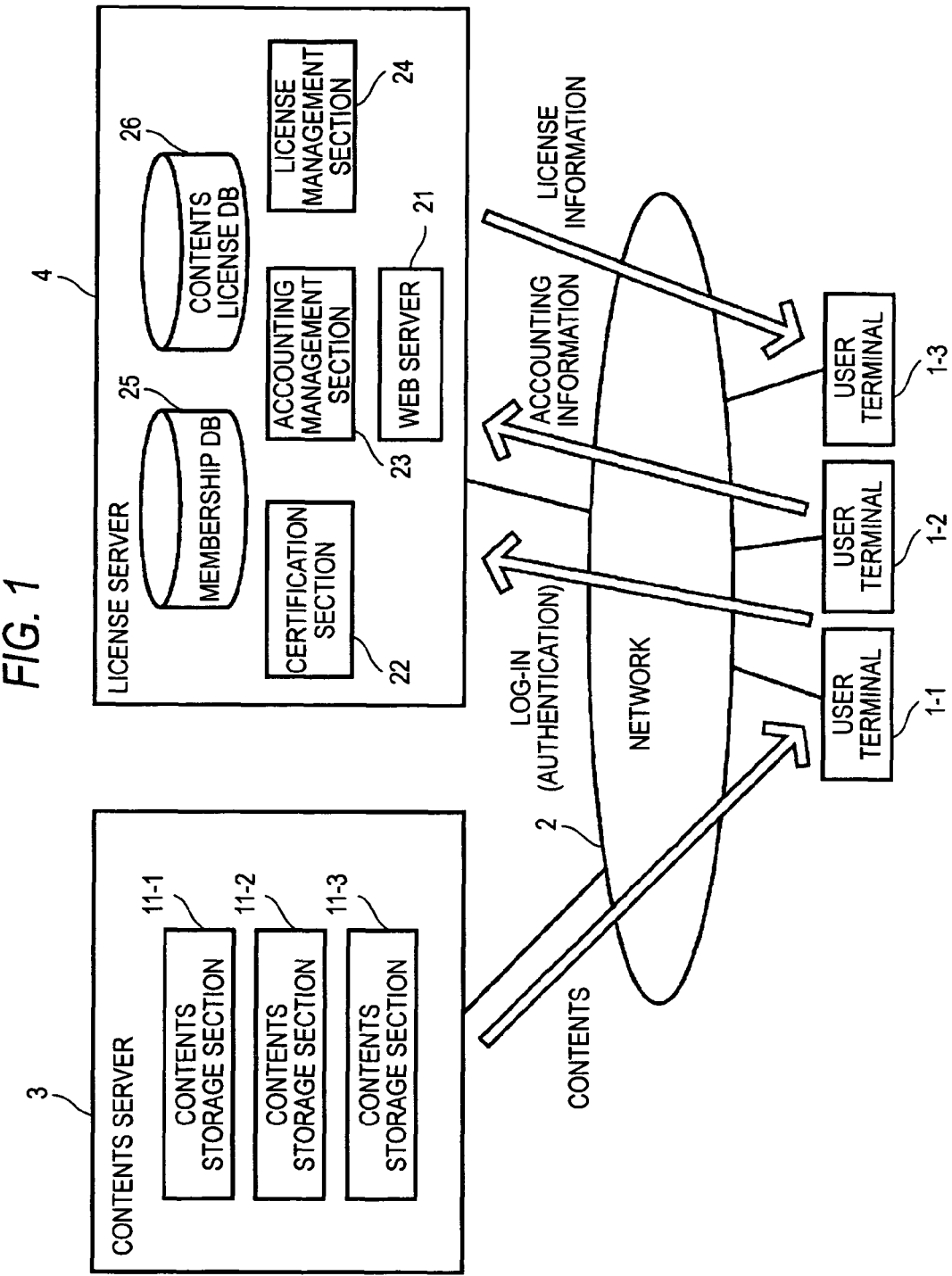
FIG. 1 is a view showing an example of configuration of a contents-providing system according to an embodiment of the invention.

The embodiments of the invention will be described below. Correspondences between the constitutive requirements in the claims and the concrete examples in the embodiments can be exemplified as follow. The description here aims to confirm that concrete examples supporting subject matters stated in Claims are described in EMBODIMENTS. Therefore, even if there is a concrete example that is not contained here as a constituent feature corresponding to one of the constitutive requirements, while the example is described in EMBODIMENTS, that does not mean that the concrete example does not represent the constitutive requirement. Conversely, even if a concrete example is contained here as a constituent feature corresponding to one constitutive requirement, that does not mean that the concrete example does not represent any other constitutive requirement.

Further, the description here does not mean that all the subject matters corresponding to the concrete examples stated in EMBODIMENTS are cited in Claims. In other words, the description here does not deny an entity that corresponds to a concrete example contained in EMBODIMENTS, but not contained in any of Claims hereof, i.e. an entity of a possible invention that can be divided and applied, or added in an amendment in future.

The information processing system in a first example includes:

a first information processing device (e.g. license server 4 in FIG. 1); and a second information processing device (e.g. user terminal 1-1 in FIG. 1), the first information processing device having a license information-sending unit (e.g. license management section 24 in FIG. 1) operable to send a piece of license information containing a piece of utilizing-time limit information for utilizing a content in response to a request from the second information processing device, and the second information processing device having a license information-receiving unit (e.g. license acquisition control section 113 in FIG. 4) operable to receive the license information sent by the license information-sending unit, a time information acquisition unit (e.g. time information acquisition unit 121 in FIG. 4) operable to acquire a piece of time information through the network(e.g. network 2 in FIG. 1), an internal clock-setting unit (e.g. internal clock management section 123 in FIG. 4) operable to refer to the time information acquired by the time information acquisition unit and to set a piece of time information of a built-in internal clock (e.g. internal clock 52 in FIG. 4), and a utilization-controlling unit (e.g. reproduction control section 111 in FIG. 4) operable to control the utilization of a content that the license information received by the license information-receiving unit targets, based on the time information of the internal clock set by the internal clock-setting unit and a piece of time information of a counter (e.g. application counter 84 in FIG. 4) working independently of the internal clock.

The information processing device (e.g. user terminal 1-1 in FIG. 1) in a second example includes:

a license information-receiving unit (e.g. license acquisition control section 113 in FIG. 4) operable to receive a piece of license information containing a piece of utilizing-time limit information for utilizing a content from a different information processing device (e.g. license server 4 in FIG. 1);

a time information acquisition unit (e.g. time information acquisition section 121 in FIG. 4) operable to acquire a time information through a network (e.g. network 2 in FIG. 1);

an internal clock-setting unit (e.g. internal clock management section 123 in FIG. 4) operable to refer to the time information acquired by the time information acquisition unit and to set a piece of time information of a built-in internal clock(e.g. internal clock 52 in FIG. 4); and a utilization-controlling unit (e.g. reproduction control section 111 in FIG. 4) operable to control utilization of the content that the license information received by the license information-receiving unit targets, based on the time information of the internal clock set by the internal clock-setting unit and a piece of time information of a counter (e.g. application counter 84 in FIG. 4) working independently of the internal clock.

The information processing device in a third example further includes:

a time-judging unit (e.g. time-judging section 122 in FIG. 4) operable to judge whether or not the time information of the internal clock is faster than that of the counter; and a counter-setting unit (e.g. application counter management section 124 in FIG. 4, which executes the process of Step S83 in FIG. 13) operable to set the time information of the counter so as to coincide with the time information of the internal clock when the time-judging unit judges that the time information of the internal clock is faster than that of the counter.

The information processing device in a fourth example further includes a counter-setting unit (e.g. application counter management section 124 in FIG. 4, which executes the process of Step S124 in FIG. 15) operable to refer to the time information acquired by the time information acquisition unit and to set the time information of the counter.

The information processing device in a fourth example further includes a counter-setting unit (e.g. application counter management section 124 in FIG. 4, which executes the process of Step S124 in FIG. 15) operable to refer to the time information acquired by the time information acquisition unit and to set the time information of the counter.

Figure 4:
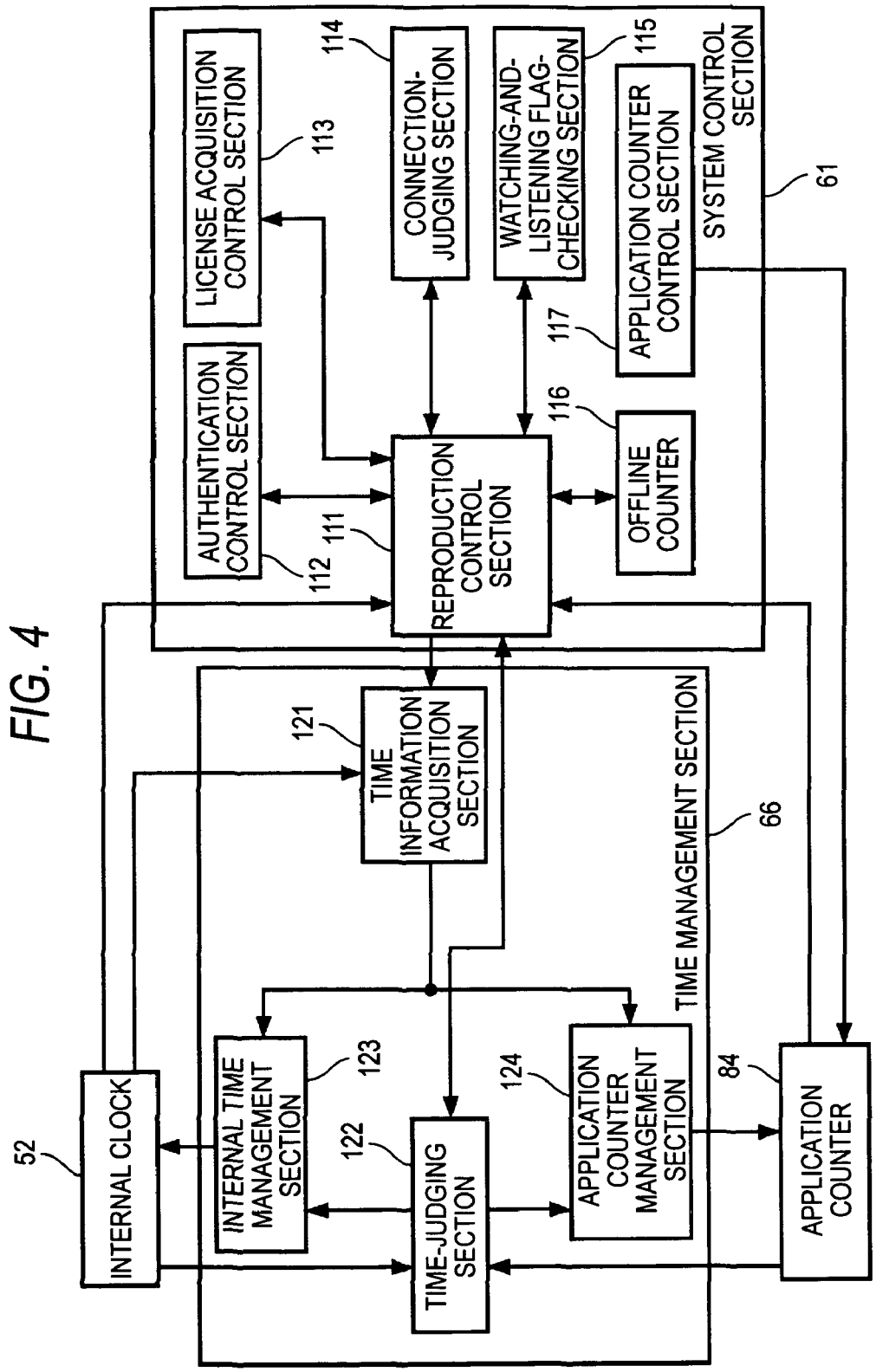
FIG. 4 is a block diagram showing in detail an example of functional configuration of the user terminal in FIG. 3.
Figures 5, 6:
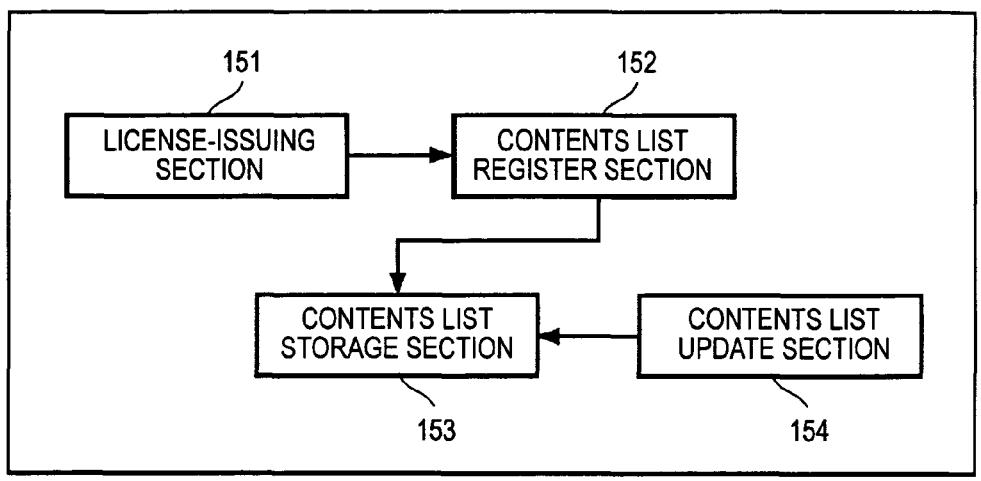
FIG. 5 is a block diagram showing in detail an example of functional configuration of a license management section in FIG. 1.
FIG. 6 is a view of assistance in explaining an example of a contents list.

The information processing device in a fifth example further includes a flag-checking unit (e.g. watching-and-listening flag-checking section 115 in FIG. 4) operable to check a contents playback-authorizing flag (e.g. watching-and-listening flag showing WATCHING- AND/OR LISTENING-AUTHORIZED in FIG. 6) showing that the content is available, when utilization of the content is directed, the contents playback-authorizing flag managed by the different information processing device, wherein when it is recognized by the flag-checking unit that the contents playback-authorizing flag is not present, the utilization-controlling unit exercises control to forbid utilization of the content.

Figure 12:
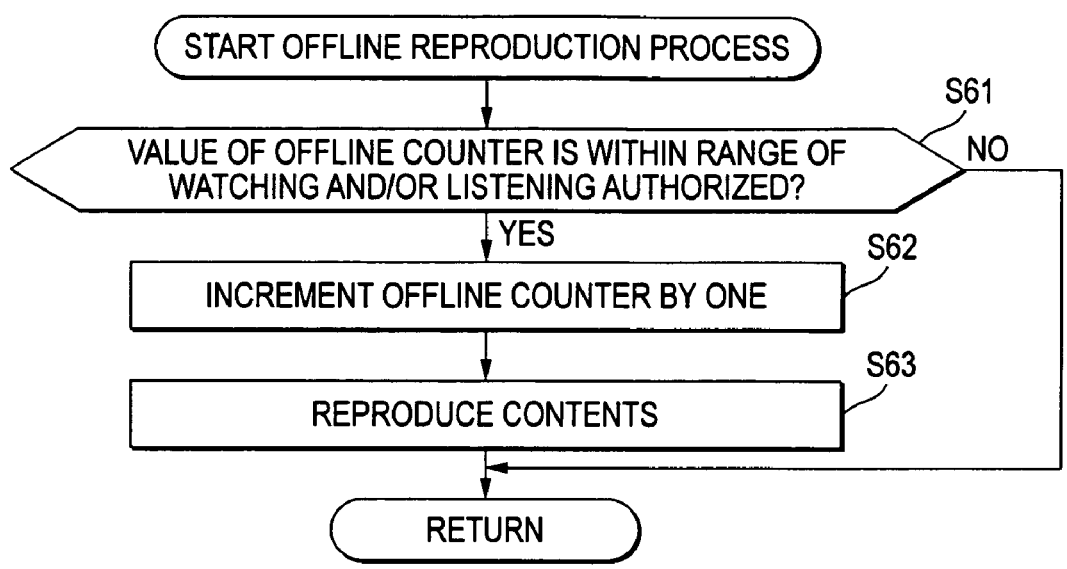
FIG. 12 is a flow chart of assistance in explaining an offline reproduction process of Step S42 in FIG. 11.

In the information processing device in a sixth example, the license information contains a utilizing-limit datum for the case of utilizing the content offline. In addition, the information processing device further includes:

a number-of-utilizations-counting unit (e.g. offline counter 116 in FIG. 4) operable to count a number of times that the content is utilized when the utilization-controlling unit controls offline utilization of the content; and a utilizing-limit-judging unit (e.g. reproduction control section 111, which executes the process of Step S61 in FIG. 12) operable to judge whether or not the number of utilizations of the content counted by the number-of-utilizations-counting unit is equal to or less than the utilizing-limit datum when the offline utilization of the content is directed, the utilization-controlling unit exercising control to forbid the offline utilization of the content when the utilizing-limit-judging unit judges that the number of utilizations of the content is above the utilizing-limit datum.

In the information processing device in a seventh example, the number-of-utilizations-counting unit (e.g. offline counter 116 in FIG. 4, which executes the process of Step S38 in FIG. 11) may reset the number of utilizations of the content when the contents playback-authorizing flag is recognized by the flag-checking unit.

The program in an eighth example includes:

a license information-receiving step (e.g. Step S39 in FIG. 11) of receiving a piece of license information containing a piece of utilizing-time limit information for utilizing a content from an information processing device;

a time information-acquiring step (e.g. Step S121 in FIG. 15) of acquiring a piece of time information through the network;

an internal clock-setting step (e.g. Step S122 in FIG. 15) of referring to the time information acquired according to the process of the time information-acquiring step and then setting a piece of time information of a built-in internal clock; and a utilization-controlling step (e.g. Step S41 in FIG. 11) of controlling utilization of the content that the license information received according to the process of the license information-receiving step targets, based on the time information of the internal clock set according to the process of the internal clock-setting step or a piece of time information of a counter working independently of the internal clock.

The information processing device in a ninth example (e.g. license server 4 in FIG. 1) includes:

a license information-sending unit (e.g. license-issuing section 151 in FIG. 5) operable to send a piece of license information containing a piece of utilizing-time limit information for utilizing a content in response to a request from a different information processing device (e.g. user terminal 1-1 in FIG. 1);

a flag-setting unit (e.g. contents list register section 152 in FIG. 5) operable to set, for each user, a contents playback-authorizing flag showing that the content is available, the contents playback-authorizing flag checked by the different information processing device when the content corresponding to the license information sent by the license information-sending unit is utilized, and a flag-disabling unit (e.g. contents list update section 154 in FIG. 5) operable to disable the setting of the contents playback-authorizing flag made by the flag-setting unit based on the utilizing-time limit information contained by the license information.

The program in a tenth example includes:

a license information-sending step (e.g. Step S17 in FIG. 10) of sending a piece of license information containing a piece of utilizing-time limit information for utilizing a content in response to a request from an information processing device;

a flag-setting step (e.g. Step S18 in FIG. 10) of setting, for each user, a contents playback-authorizing flag showing that the content is available, the contents playback-authorizing flag checked by the different information processing device when the content corresponding to the license information sent according to the process of the license information-sending step is utilized, and a flag-disabling step (e.g. Step S20 in FIG. 10) of disabling the setting of the contents playback-authorizing flag made according to the process of the flag-setting step, based on the utilizing-time limit information contained by the license information.

The embodiments of the invention will be described below in reference to the drawings.

FIG. 1 shows an example of arrangement of a contents-providing system to which the invention is applied.

To a network 2, typified by the Internet, are connected user terminals 1-1 to 1-3, which are constituted by personal computers, etc. While only three user terminals 1 are shown in this example, an arbitrary number of user terminals may be connected to the network 2. The user terminals are hereinafter referred to as user terminal 1 simply in the case where there is no necessity to distinguish the user terminals 1-1 to 1-3 individually.

In addition, to the network 2 are connected: a contents server 3 that provides contents such as a moving image and music to a user terminal 1; and a license server 4 that manages the license (information on the right) of the contents provided by the contents server 3 and a user who utilizes the service of the contents-providing system. Also, the contents server 3 and license server 4 may be connected to the network 2 in arbitrary numbers.

In other words, the contents-providing system in FIG. 1 provides service to acquire a license for watching and/listening to contents of the contents server 3. Incidentally, in the contents-providing system in FIG. 1, a cipher system e.g. SSL (Secure Socket Layer) is used for receiving and transmission between the license server 4 and user terminal 1, the description on which is omitted here.

The user terminal 1 uses a client software such as a Web browser to display a login (authentication) screen for utilizing service of the contents-providing system from a Web server 21 of the license server 4. Then, a request for authentication is made to a certification section 22 based on a user operation. When the certification section 22 authenticates the user terminal 1, the user can utilize a service such as acquisition of license (information on the right) of contents, which is a service provided by the contents-providing system, until the end of utilizing the service (log-out) is directed.

The user terminal 1, the detail of which is to be later described in reference to FIG. 3, has: an internal clock that performs a clocking operation; and an application counter that performs a clocking operation independently of the internal clock.

In other words, the user terminal 1 makes a request for watching and/or listening contents of the contents server 3 to an accounting management section 23, and sends its accounting information to the accounting management section 23 while authenticated by the certification section 22. In response to this, the license management section 24 issues a piece of license information having a term of validity and as such, the user terminal 1 acquires the license information. Then, the user terminal 1 checks the term of validity of the acquired license information based on the time information on the internal clock or application counter. When it is within the term of validity, the user terminal uses the license key included in the license information to decode and reproduce the contents acquired from the contents server 3.

The contents server 3 has contents storage sections 11-1, 11-2 and 11-3 that store contents such as a moving image and music. The contents storage sections are hereinafter referred to as contents storage section 11 simply in the case where there is no necessity to distinguish the sections individually. Many of the contents stored in the contents storage section 11 are ones that need copyright protection and are encrypted. The contents server 3 provides encrypted contents to the user terminal 1 through the network 2.

The license server 4 includes: a Web server 21; a certification section 22; an accounting management section 23; a license management section 24; a membership database (DB) 25; and a contents license database (DB) 26. These portions of the license server 4 are each configured as a functional block realized when a CPU (central Processing Unit) of the license server 4 to be described later executes a certain program. However, the portions may be configured as hardware.

The Web server 21 accumulates information for utilizing the contents-providing system such as HTML (HyperText Markup Language) documents and images and provides the user terminal 1 with such information, i.e. screen data for a Web browser, in response to a request from the user terminal 1. The certification section 22 executes a process of authenticating the user terminal 1 based on the user information registered in the membership database 25 in response to a request for authentication from the user terminal 1. Then, when the user terminal 1 is authenticated, the authenticated user terminal 1 is permitted to utilize the contents-providing system (i.e. to acquire the license of contents).

When the user terminal 1 authenticated by the certification section 22 makes a request for watching and/or listening to contents of the contents server 3, the accounting management section 23 performs an accounting process for watching and/or listening to the contents and acquires the accounting information from the user terminal 1.

The license management section 24 issues a license to watch and/or listen to contents based on the accounting information on the user terminal 1 from the accounting management section 23 and sends the issued license information to the user terminal 1. The license information includes the term of validity of the license, offline-utilizing limit data to utilize contents when the terminal is unconnected to the network 2 (i.e. when the terminal stays offline), and a license key to decrypt the ciphers of the contents. The offline-utilizing limit data is, for example, data of limits including the number of times that contents can be reproduced offline and a length of time during which contents can be reproduced offline.

Also, the license management section 24 manages a contents list that is checked through the network 2 when the user terminal 1 reproduces contents. The license management section 24 registers a contents list, which is information on license-issued contents for each user, based on the issued license information. The contents list includes a targeted contents title, the term of validity of the license, and a watching-and-listening flag that shows whether or not the targeted content is watching- and/or listening-authorized.

In the membership database 25 is registered user information on users who utilize the contents-providing system. The user information includes, for example, a user ID (identification) to determine (or identify) a user, a password, and user's personal information (e.g. his or her name, address, schedule, and credit card number).

In the contents license database 26 are registered a contents title, the term of validity of a license, contents-utilizing limit data at the time of offline, license information such as a license key to decrypt the cipher of targeted contents for each user ID of appropriate user.

Now, the network 2 of the contents-providing system in FIG. 1 uses NTP (NetworkTimeProtocol). That is, the license server 4 uses highly precise time information from an atomic clock, a GPS (Global Positioning System) receiver, or the like to correct its own time information at all times and concurrently sends the time information to the contents server 3. The contents server 3 corrects its own time information based on the time information coming from the license server 4.

Hence, the user terminal 1 can acquire the time information sent from the license server 4 to the contents server 3 on the network 2, thereby to correct the time information of its own internal clock and the time information of the application counter. Incidentally, the server that has highly precise time information as described above is not necessarily the license server 4, and it may be the contents server 3 or another one (not shown), as long as it is connected to the network 2. In this case, the server that has highly precise time information is to send its time information to the license server 4, etc.

In the contents-providing system, when the user terminal 1 receives a direction for reproduction of contents from a user, it makes a judgment about the term of validity of the license information based on not only its own internal clock or application counter, both of which are set based on the time information on the network 2, but also a watching-and-listening flag in a contents list that the license server 4 has. The detail of this is to be described later.

In other words, in the contents-providing system in FIG. 1, the term of validity of the license of contents is managed on not only the user terminal 1 but also the license server 4. Therefore, it becomes possible to inhibit illegal reproduction of contents with the term of validity of the license doctored in the user terminal 1 after the expiration of the actual term.

In the example of FIG. 1, the contents server 3 and license server 4 are constituted separately. However, the contents server 3 and license server 4 may be integrated. Also, the constituents of the license server 4, i.e. the certification section 22, accounting management section 23, license management section 24 and Web server 21, may be constituted by different servers respectively. In other words, the server arrangement is not limited to the arrangement in FIG. 1.

The user terminal 1 may be constituted by a personal computer, obviously. However, the user terminal 1 can be constituted by e.g. a cellular telephone, any other PDA (Personal Digital Assistant) tool, an AV (Audio Visual) apparatus, or a CE (Consumer Electronics) such as a home electric (household electrical) appliance.

Figure 2:
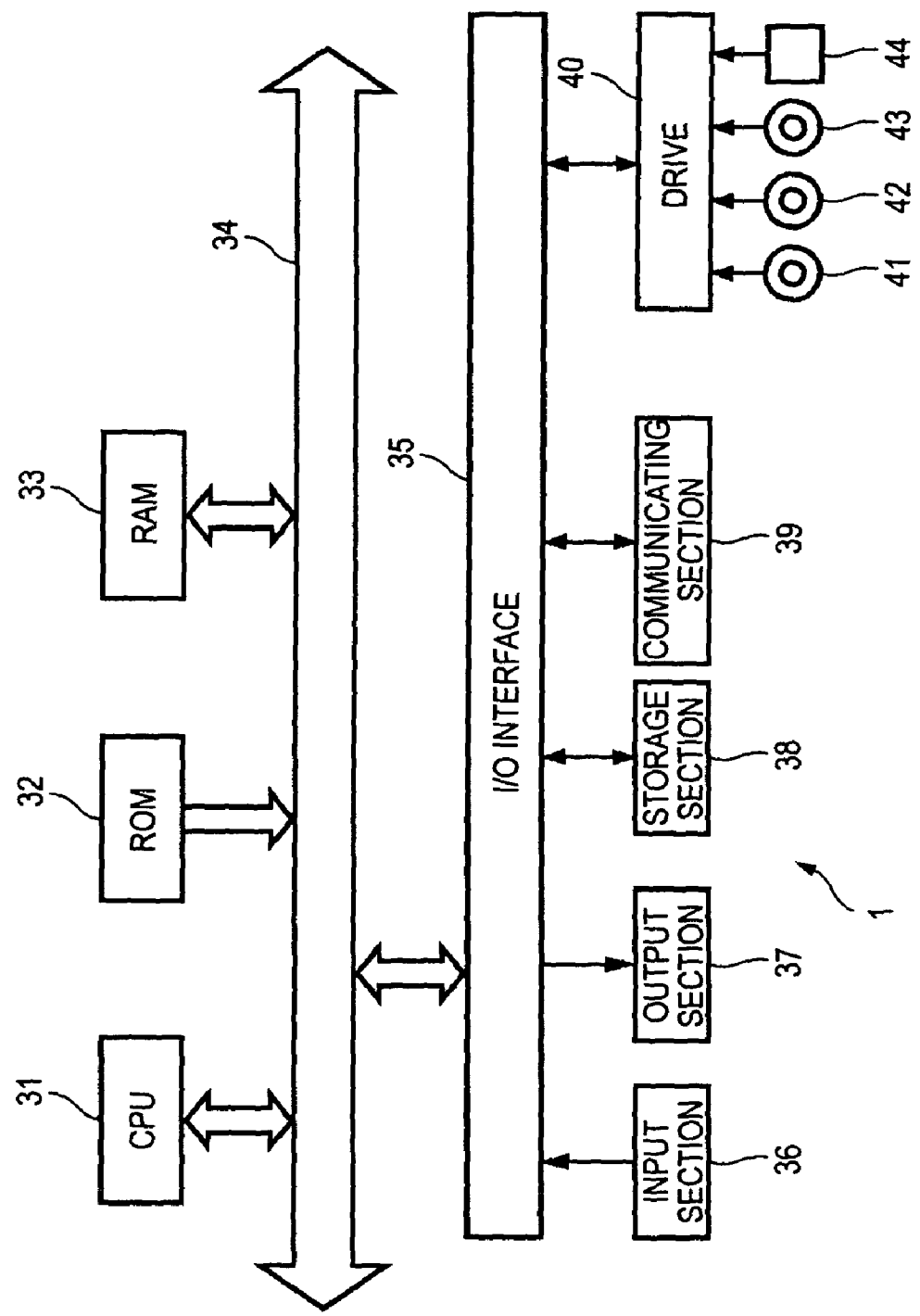
FIG. 2 is a block diagram showing an example of configuration of a user terminal in FIG. 1.

FIG. 2 shows an example of hardware configuration of the user terminal 1. As in the drawing, the user terminal 1 is constituted based on e.g. a computer.

The CPU (Central Processing Unit) 31 executes various kinds of processes following a program stored in a ROM (Read Only Memory) 32 or a program loaded from the storage section 38 into a RAM (Random Access Memory) 33. Also, in the RAM 33 are stored the data necessary for the CPU 31 to execute the various kinds of processes and others appropriately.

The CPU 31, ROM 32 and RAM 33 are interconnected through a bus 34. Also, an I/O (Input/Output) interface 35 is connected to the bus 34.

To the I/O interface 35 are connected: an input section 36 including a keyboard and a mouse; an output section 37 including a display such as a CRT (Cathode Ray Tube) and an LCD (Liquid Crystal Display)., a speaker, and the like; a storage section 38 constituted by a hard disk or the like; and a communicating section 39 constituted b a modem, a terminal adapter or the like. The communicating section 39 communicates through the network 2.

Also, to the I/O interface 35 is connected a drive 40 if required. On the drive 40, e.g. a magnetic disk 41, an optical disk 42, an optical magnetic disk 43 and a semiconductor memory 44 can be attached appropriately. A computer program read out from them is installed on the storage section 38 as required.

Also, the contents server 3 and license server 4 are each constituted by a computer having basically the same configuration as that of the user terminal 1 shown in FIG. 2, which are not shown. Hence, in the description below, the configuration in FIG. 2 will be cited as the configuration of the contents server 3 or license server 4.

Here, the CPU 31 executes various programs, and thus the computer in FIG. 2 works as the user terminal 1, contents server 3 or license server 4 in FIG. 1. In this case, the programs may be previously recorded in the ROM 32 used as a recording medium built in the computer in FIG. 2 or the storage section 38. Alternatively, the programs may be temporarily or permanently saved (recorded) in a removable recording medium such as the magnetic disk 41, optical disk 42, optical magnetic disk 43, or semiconductor memory 44 and then supplied as a so-called software package.

The programs may be installed on the computer shown in FIG. 2 from a removable recording medium as described above. Alternatively, the programs may be installed on the computer in FIG. 2 by transfer by radio from a download site through an artificial satellite for digital satellite broadcasting to the computer, or transfer by wire through a LAN (Local Area Network) and the network 2 to the computer.

Figure 3:
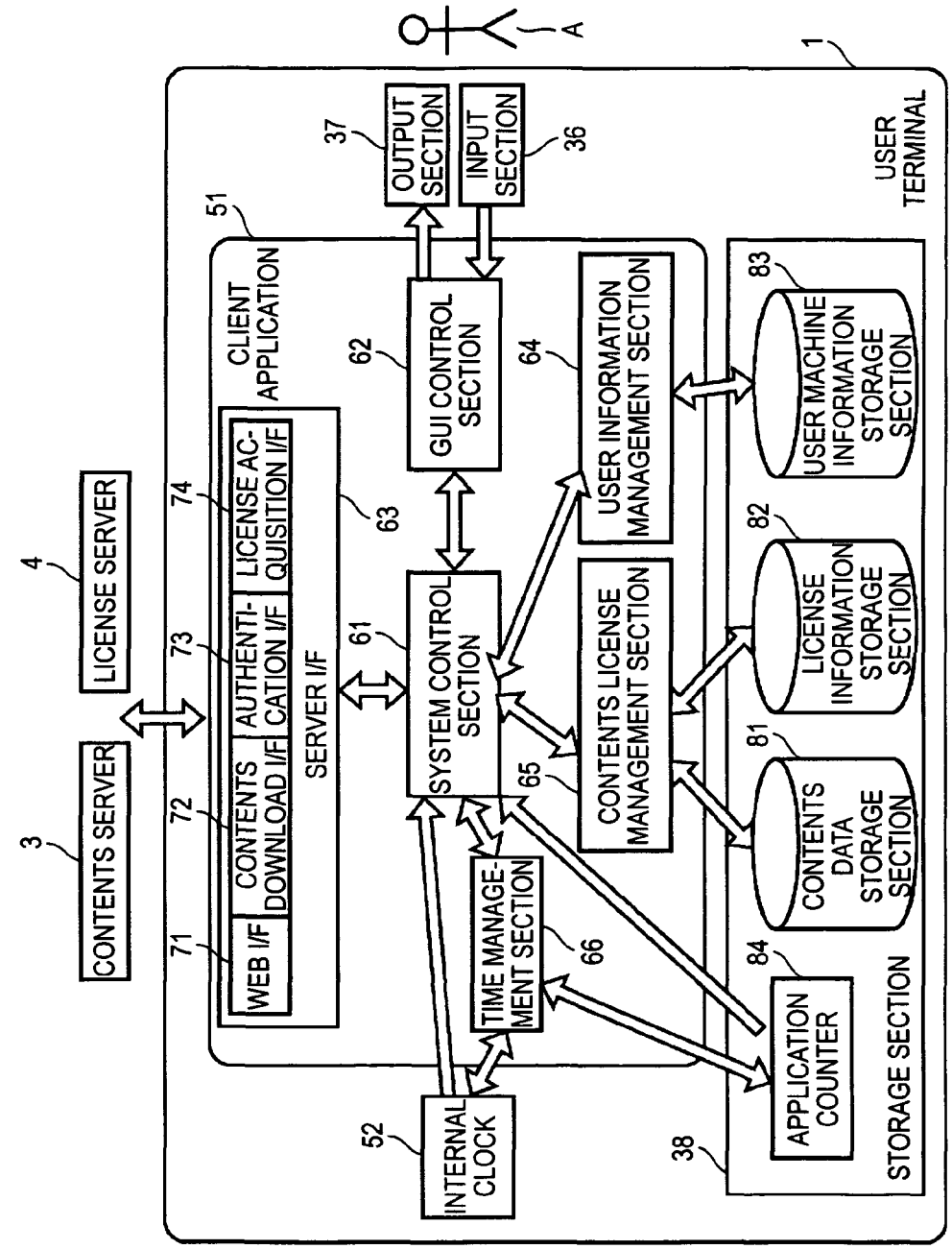
FIG. 3 is a block diagram showing an example of functional configuration of the user terminal in FIG. 1.

FIG. 3 is a block diagram showing an example of functional configuration of the user terminal 1. Functional blocks shown in FIG. 3 are realized when a CPU 31 of the user terminal 1 executes a client application 51.

Specifically, in the example of FIG. 3, a user A uses a mouse constituting the input section 36 to start the client application 51 that is configured of e.g. a Web browser. When the direction to start the client application 51 is input through the input section 36, the CPU 31 executes the client application 51. Thus, the client application 51 realizes functional blocks including a system control section 61, a GUI (Graphical User Interface) control section 62, a server interface (I/F) 63, a user information management section 64, a contents license management section 65, and a time management section 66.

Also, the user terminal 1 is provided with an internal clock 52 that performs a clocking operation. The time information that the internal clock 52 has can be changed by the user A.

Further, in the example of FIG. 3, the storage section 38 includes a contents data storage section 81, a license information storage section 82, a user machine information storage section 83, and an application counter 84 that performs a clocking operation independently of the internal clock 52.

The system control section 61 controls the GUI control section 62, server interface 63, user information management section 64, contents license management section 65 and time management section 66 according to an operation by the user A supplied through the GUI control section 62 and information and data supplied through the server interface 63 from the contents server 3 and license server 4, based on the time information that the internal clock 52 or application counter 84 has, and then executes various kinds of processes.

More specifically, when receiving the direction to reproduce contents, the system control section 61 makes the contents license management section 65 acquire the license information of the contents, and judges based on the time information of the internal clock 52 or application counter 84 whether the current time falls in the term of validity of the license information. If the current time falls within the term of validity of the license information, the system control section 61 checks the watching-and-listening flag in the license server 4 (license management section 24) through the server interface 63. Then, if the watching-and-listening flag in the license server 4 permits watching and/or listening, the system control section 61 reproduces the contents, controls the GUI control section 62, and makes a monitor that the output section 37 includes display an image involved in the reproduced contents.

When an operation by the user A is input through the input section 36, the GUI control section 62 supplies an operation signal corresponding to the operation to the system control section 61, and under the control of the system control section 61 exercises the control to make the monitor, which is included in the output section 37, display an image equivalent to the screen data supplied through the server interface 63 from the Web server 21 of the license server 4 or an image equivalent to contents data reproduced by the system control section 61.

The server interface 63 includes an Web interface (I/F) 71, a contents download interface (I/F) 72, an authentication interface (I/F) 73, and a license acquisition interface (I/F) 74. The server interface 63 receives information from the contents server 3 or license server 4 through the network 2, supplies the received information to the system control section 61, and sends various kinds of data through the network 2 to the contents server 3 or license server 4 according to the control of the system control section 61.

The Web interface 71 communicates with the Web server 21 of the license server 4 under the control of the system control section 61. More specifically, the Web interface 71 sends a request (information) to the Web server 21, which is supplied from the GUI control section 62, and receives screen data supplied from the Web server 21 to supply the screen data to the GUI control section 62 through the system control section 61.

The contents download interface 72 communicates with the contents server 3 under the control of the system control section 61. More specifically, the contents download interface 72 sends a request for contents, which is supplied from the GUI control section 62, to the contents server 3, and receives contents data supplied from the contents server 3 to supply the contents data to contents license management section 65 through the system control section 61.

The authentication interface 73 communicates with the certification section 22 of the license server 4 under the control of the system control section 61. More specifically, the authentication interface 73 sends information supplied from the GUI control section 62 or user information management section 64 to the certification section 22, and receives the result of authentication or a request from the certification section 22 to supply it to the system control section 61.

The license acquisition interface 74 communicates with the accounting management section 23 and license management section 24 of the license server 4 under the control of the system control section 61. More specifically, the license acquisition interface 74 sends a request for license acquisition, accounting information, etc. supplied from the GUI control section 62 to the accounting management section 23. Also, the license acquisition interface 74 supplies a request for accounting information from the accounting management section 23 to the GUI control section 62 through the system control section 61, and receives license information supplied from the license management section 24 as the result of accounting process by the accounting management section 23 to supply the license information to the contents license management section 65 through the system control section 61.

The user information management section 64 manages the information recorded in the user machine information storage section 83 under the control of the system control section 61. More specifically, the user information management section 64 records information in the user machine information storage section 83 and reads out the information from the user machine information storage section 83.

The contents license management section 65 manages the contents data storage section 81 and the license information storage section 82 under the control of the system control section 61. More specifically, the contents license management section 65 records contents data supplied from the contents download interface 72 as a contents data file in the contents data storage section 81.

Also, the contents license management section 65 reads out the license information corresponding to the requested contents from the license information storage section 82 in response to a request for reproduction of contents from the GUI control section 62, and then supplies the read license information to the system control section 61. Further, the contents license management section 65 reads out the requested contents data file from the contents data storage section 81 and supplies the read contents data file to the system control section 61.

The time management section 66 connects with the network 2 through the license acquisition interface 74 periodically or under the control of the system control section 61, acquires time information on the network 2, e.g. NTP, and sets the time information of the internal clock 52 based on the acquired time information. At this time, if the application counter 84 has been activated, the time management section 66 also sets the time information of the application counter 84.

In addition, when the application counter 84 has been activated, the time management section 66 compares the time information of the internal clock 52 with that of the application counter 84, and sets one time information so as to coincide with the other time information based on the result of the comparison, and directs the system control section 61 which time information (either the internal clock 52 or the application counter 84) should be referred to.

The contents data storage section 81 stores encrypted contents data files of a moving image, a still image, music, etc., which the contents server 3 supplies. The cipher of the contents data files can be decrypted with a license key that the corresponding license information includes.

The license information storage section 82 stores the license information that the license management section 24 of the license server 4 issues for each content. As described above, the license information contains the term of validity of a license, contents-utilizing limits at the time of offline, and a license key to decrypt the cipher of a contents data file.

In the user machine information storage section 83 are stored users' personal information, machine information specific to the user terminal 1, and others. The users' personal information includes the name, mail address and residential place of the user A. Further, the users' personal information can include a user ID and a password. The machine information specific to the user terminal 1 is information for determining a certain block constituting the user terminal 1, which represents e.g. a CPU's ID to determine the CPU 31 incorporated when factory-supplied or when manufactured, a recording medium ID to determine a storage section 38 incorporated in the storage section 38, or a MAC address of the network interface that constitutes the communicating section 39.

The application counter 84 is activated under the control of the system control section 61, and performs a clocking operation independently of the internal clock 52. The application counter 84 can be controlled according to a user operation so as to be activated or stopped. However, it is more desirable that the application counter is a resident program that constantly works while the user terminal 1 is kept on.

FIG. 4 is a functional block diagram of assistance in explaining functions that the user terminal 1 can realize. The functional block diagram of FIG. 4 shows an example of arrangement of the system control section 61 and time management section 66 in FIG. 3.

In the case of the example shown by FIG. 4, the system control section 61 includes a reproduction control section 111, an authentication control section 112, a license acquisition control section 113, a connection-judging section 114, a watching-and-listening flag-checking section 115, an offline counter 116, and an application counter control section 117.

The reproduction control section 111 controls the authentication control section 112, the license acquisition control section 113, the connection-judging section 114, and the watching-and-listening flag-checking section 115 according to an operation signal to reproduce contents, which corresponds to an operation by the user A input through the input section 36. Also, the reproduction control section 111 judges the term of validity of the corresponding license information of contents, and controls the reproduction of the contents based on the result of the judgment.

More specifically, the reproduction control section 111 controls the contents download interface 72 or the contents license management section 65, whereby contents data is acquired from the contents server 3 or the contents data storage section 81. In addition, the reproduction control section 111 controls the authentication control section 112 and the license acquisition control section 113 or the contents license management section 65, whereby the license information corresponding to the targeted contents data is acquired from the license server 4 or the license information storage section 82. Incidentally, during such processes, the reproduction control section 111 controls the time information acquisition section 121 or time-judging section 122, whereby the time information of the internal clock 52 and the application counter 84 is set.

Also, the reproduction control section 111 refers to the time information of either the internal clock 52 or application counter 84 based on the direction by the time-judging section 122. Then, when the current time that the internal clock 52 or application counter 84 indicates falls in the term of validity of the license information, the reproduction control section 111 controls the connection-judging section 114 to make it judge whether the user terminal connects with the network 2 (i.e. the terminal 1 is on line).

When the user terminal 1 connects with the network 2, the reproduction control section 111 controls the watching-and-listening flag-checking section 115 to make the section check whether the watching-and-listening flag in the license server 4 permits watching and/or listening. When the watching-and-listening flag permits watching and/or listening, the targeted contents data is decoded using a license key that the license information includes. Then, the decoded contents data is reproduced and supplied to the GUI control section 62.

However, in the case where the user terminal 1 is not connected with the network 2, when the value of the offline counter 116 is below the contents-utilizing limit at the time of offline of the license information (i.e. the number of times of offline watching and/or listening, which represents the number of times that contents can be watched and/or listened to offline in the example of FIG. 4), the reproduction control section 111 decodes the targeted contents data with a license key that the license information contains. Then, the reproduction control section 111 reproduces the decoded contents data, controls the GUI control section 62 and makes the monitor, which constitutes the output section 37, display contents.

Also, the reproduction control section 111 makes the offline counter 116 count once for each offline contents reproduction. The offline counter 116 can count even the number of times of offline watching and/or listening of license information for each content. In the case where it is recognized that the watching-and-listening flag in the license server 4 permits watching and/or listening when the targeted contents are reproduced on line, the reproduction control section 111 resets the offline counter 116 for the contents.

In response to an operation signal corresponding to the operation by the user A input through the input section 36 or a direction by the reproduction control section 111, the authentication control section 112 executes an authentication process together with the certification section 22 with the authentication interface 73 interposed therebetween. Then, the authentication control section 112 supplies the result of authentication to the reproduction control section 111 or the license acquisition section 113.

In response to an operation signal corresponding to the operation by the user A input through the input section 36 or a direction by the reproduction control section 111, the license acquisition section 113 performs an accounting process together with the accounting management section 23 of the license server 4 with the license acquisition interface 74 interposed therebetween. As a result of the accounting process, the license acquisition section 113 acquires the license information from the license management section 24 and supplies the acquired license information to the reproduction control section 111 or contents license management section 65.

Under the control of the reproduction control section 111, the connection-controlling section 114 judges whether or not the user terminal 1 connects with the network 2, and supplies the result of the judgment to the reproduction control section 111. The watching-and-listening flag-checking section 115 checks through the license acquisition interface 74 whether or not the watching-and-listening flag of the license management section 24 of the license server 4 permits watching and/or listening, and supplies the result of the checking to the reproduction control section 111.

The reproduction control section 111 makes the offline counter 116 count the number of times the content has been reproduced offline until it reaches the number of times of offline watching and/or listening that the license information contains. The offline counter 116 is reset by the reproduction control section 111 when the watching-and-listening flag-checking section 115 accesses the license server 4 and then the watching-and-listening flag allowing watching and/or listening is recognized.

The application counter control section 117 can control the activation and termination of the application counter 84 according to an operation signal corresponding to the operation by the user A or a direction from OS (Operation System) on the user terminal 1.

The time management section 66 includes: a time information acquisition section 121; a time-judging section 122; an internal time management section 123; and an application counter management section 124.

The time information acquisition section 121 connects with the network 1 through the license acquisition interface 74 in a fixed cycle based on the clocking operation that the internal clock 52 performs or under the control of the reproduction control section 111, acquires the time information on the network 2, such as NTP, and supplies the acquired time information to the internal time management section 123 and the application counter management section 124. Incidentally, the method for acquisition of the time information is not limited to this one. The time information may be acquired from the license server 4, for example.

The time-judging section 122 compares the time information of the internal clock 52 with that of the application counter 84 at the time when the application counter 84 is activated or under the control of the reproduction control section 111. Based on the result of the comparison, the time-judging section 122 controls the internal clock management section 123 or the application counter management section 124 so that one of the internal clock 52 and application counter 84 coincides with the other in time information. Based on the result of the comparison, the time-judging section 122 also directs the reproduction control section 111 which time information it should refer to.

The internal clock management section 123 sets the time information of the internal clock 52 based on the time information supplied from the time information acquisition section 121 or according to the control by the time-judging section 122. The application counter management section 124 sets the time information of the application counter 84 based on the time information supplied from the time information acquisition section 121 when the application counter 84 is activated or according to the control by the time-judging section 122.

FIG. 5 is a view showing, in detail, an example of arrangement of the license management section 24 of the license server 4 shown in FIG. 1.

In the example of FIG. 5, the license management section 24 includes a license-issuing section 151, a contents list register section 152, a contents list storage section 153 and a contents list update section 154.

The license-issuing section 151 issues license information under the control of the accounting management section 23, and registers the issued license information in the contents license database 26 concurrently with supplying the information to the contents list register section 152. The contents list register section 152 registers the contents list corresponding to the license information issued by the license-issuing section 151 in the contents list storage section 153.

In the contents list storage section 153, a contents list is registered for each user. As shown in FIG. 6, the contents list contains the title of a content whose license the user has acquired, an expiring date of the license that represents a deadline until which the contents can be watched and/or listened to under the license, and a watching-and-listening flag that shows whether or not the contents can be watched and/or listened to based on the expiring date of the license.

The contents list update section 154 refers to its built-in internal clock, and compares the current time with an expiring date registered in the contents list storage section 153 thereby to judge whether or not there is an expired contents. In the case where it is judged that an expired contents exists, the contents list update section 154 sets a watching-and-listening flag of the expired contents to WATCHING- AND/OR LISTENING-UNAUTHORIZED and updates the contents list of the contents list storage section 153.

FIG. 6 shows an example of a contents list stored in the contents list storage section 153 shown in FIG. 5. The contents list is managed for each user (or user terminal).

In the example shown by FIG. 6, the contents list contains: a content having the contents title "SUPPAINA-MAN," the expiring date "2004/5/25/12:00 (12:00 on May 25, 2004)," and the watching-and-listening flag of "WATCHING- AND LISTENING-UNAUTHORIZED"; and a content having the contents title "CUTICLE BUNNY," the expiring date "2004/5/26/21:00" (21:00 on May 26, 2004), and the watching-and-listening flag of "WATCHING- AND LISTENING-AUTHORIZED."

More specifically, when it is assumed that the current time is 18:00 on May 25, 2004, the watching-and-listening flag of the contents having the contents title "SUPPAINA-MAN" and the expiring date "2004/5/25/12:00" (12:00 on May 25, 2004) is set by the contents list update section 154 to "WATCHING- AND/OR LISTENING-UNAUTHORIZED." In contrast, with the contents having the contents title "CUTICLE BUNNY" and the expiring date "2004/5/26/21:00" (21:00 on May 26, 2004), its watching-and-listening flag remains set to "WATCHING- AND/OR LISTENING-AUTHORIZED" by the contents list update section 154.

In this way, the watching-and-listening flag is set to "watching- and listening-unauthorized" by the contents list update section 154 after the term of validity of the license information expires. Therefore, by checking of the watching-and-listening flag at the time of reproducing contents by the user terminal 1, it becomes possible to inhibit illegal reproduction of contents that is owing to doctoring the time information in the user terminal 1.

In other words, in the license server 4 the current time is compared with the expiring date of the license information based on the time information in the license server 4. In the case where the term of validity of the license information expires, the watching-and-listening flag is set to WATCHING- AND/OR LISTENING-UNAUTHORIZED. Therefore, even if the time information of the internal clock 52 in the user terminal 1 is doctored and a content is regarded as being WATCHING- AND/OR LISTENING-AUTHORIZED in the user terminal 1, the reproduction of the content is forbidden in the user terminal 1 in which the watching-and-listening flag of WATCHING- AND/OR LISTENING-UNAUTHORIZED is recognized.

In the example shown in FIG. 6, after the expiring date the watching-and-listening flag is set to WATCHING- AND LISTENING-UNAUTHORIZED. However, the contents list may be deleted in the contents list storage section 153 instead.

Next, details on the time information that the user terminal 1 has will be described in reference to FIGS. 7 to 9.

Figure 7:
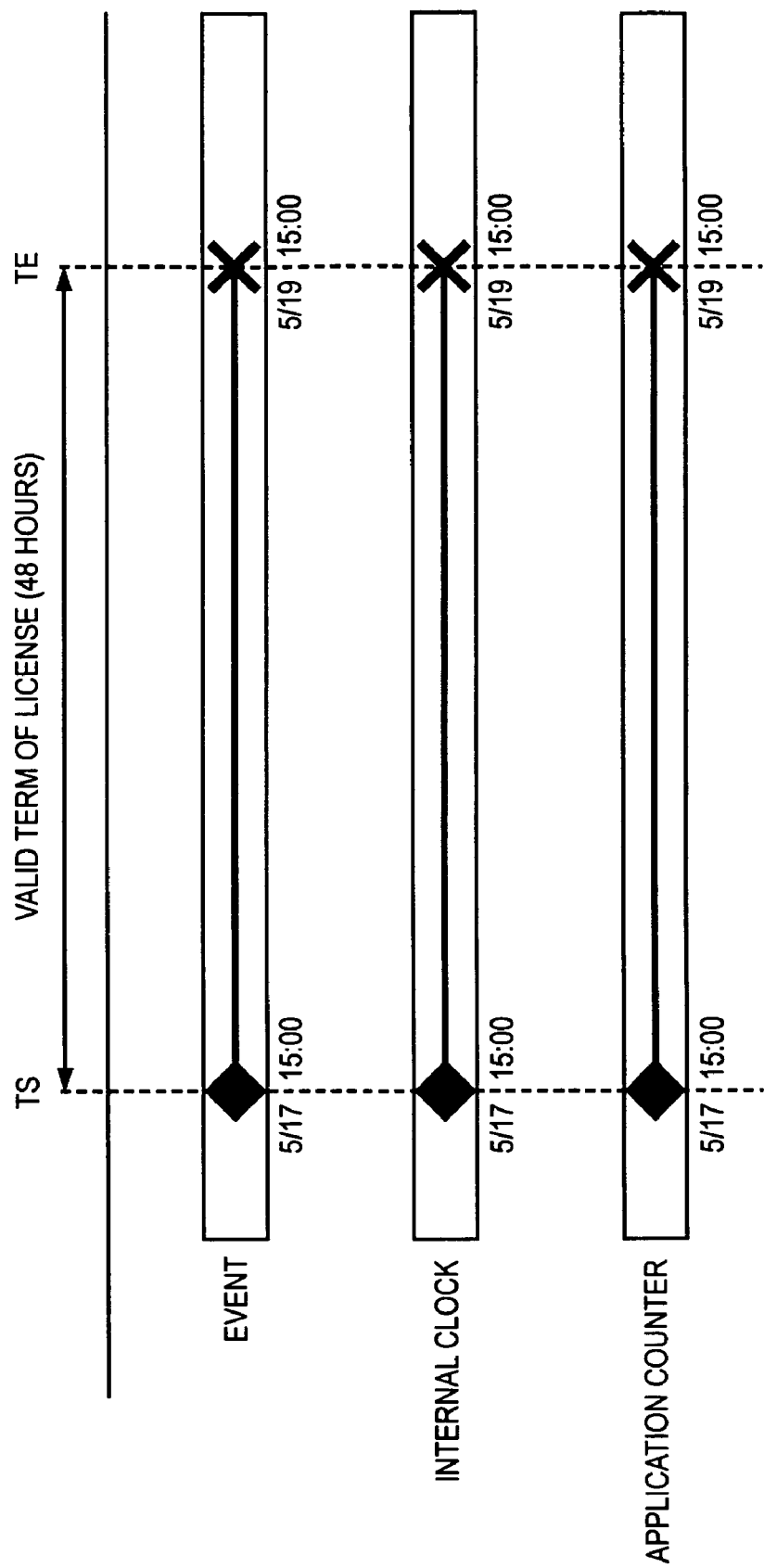
FIG. 7 is a view of assistance in explaining a set of examples of time information in the user terminal shown in FIG. 1.
Figure 8:
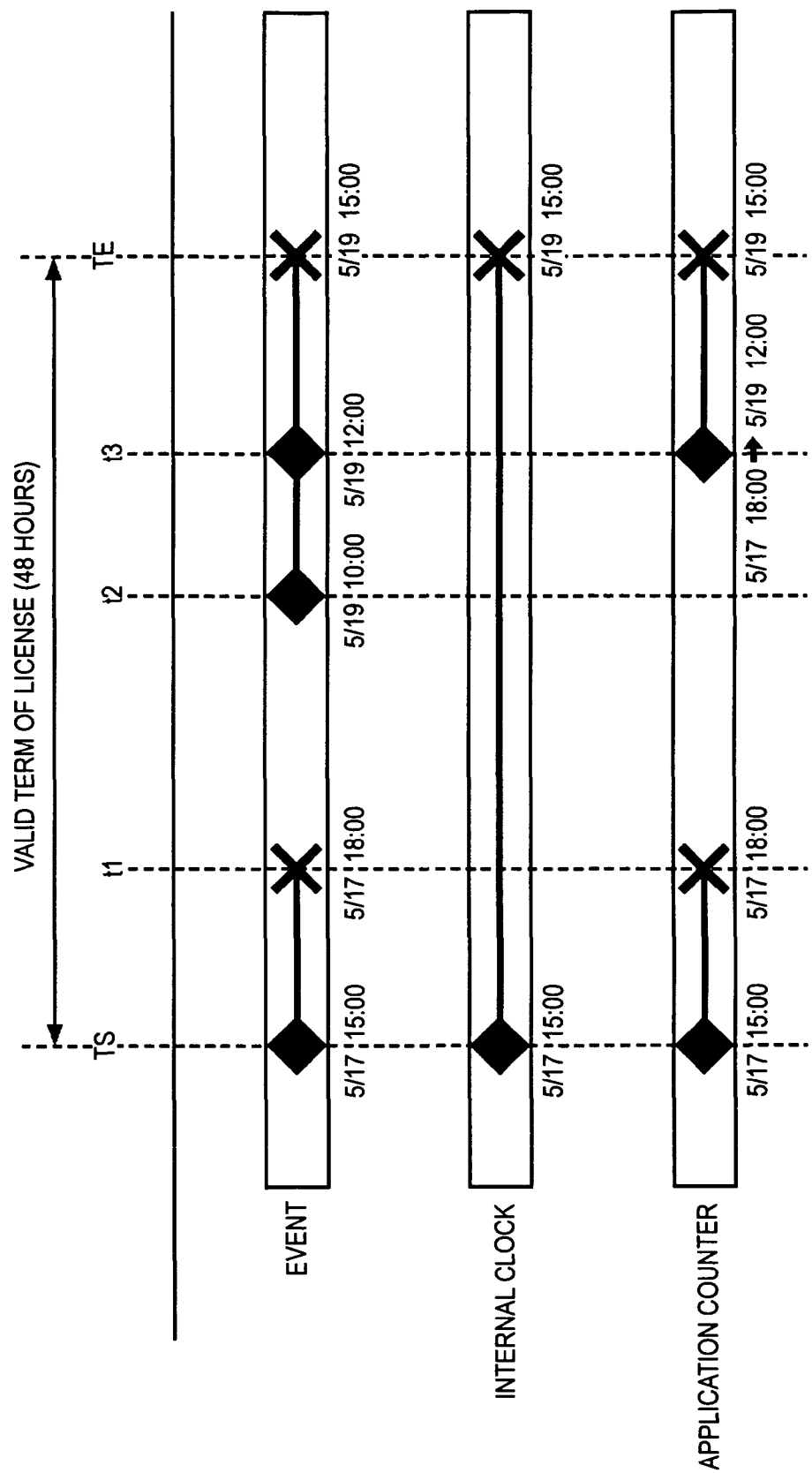
FIG. 8 is a view of assistance in explaining another set of examples of time information in the user terminal in FIG. 1.
Figure 9:
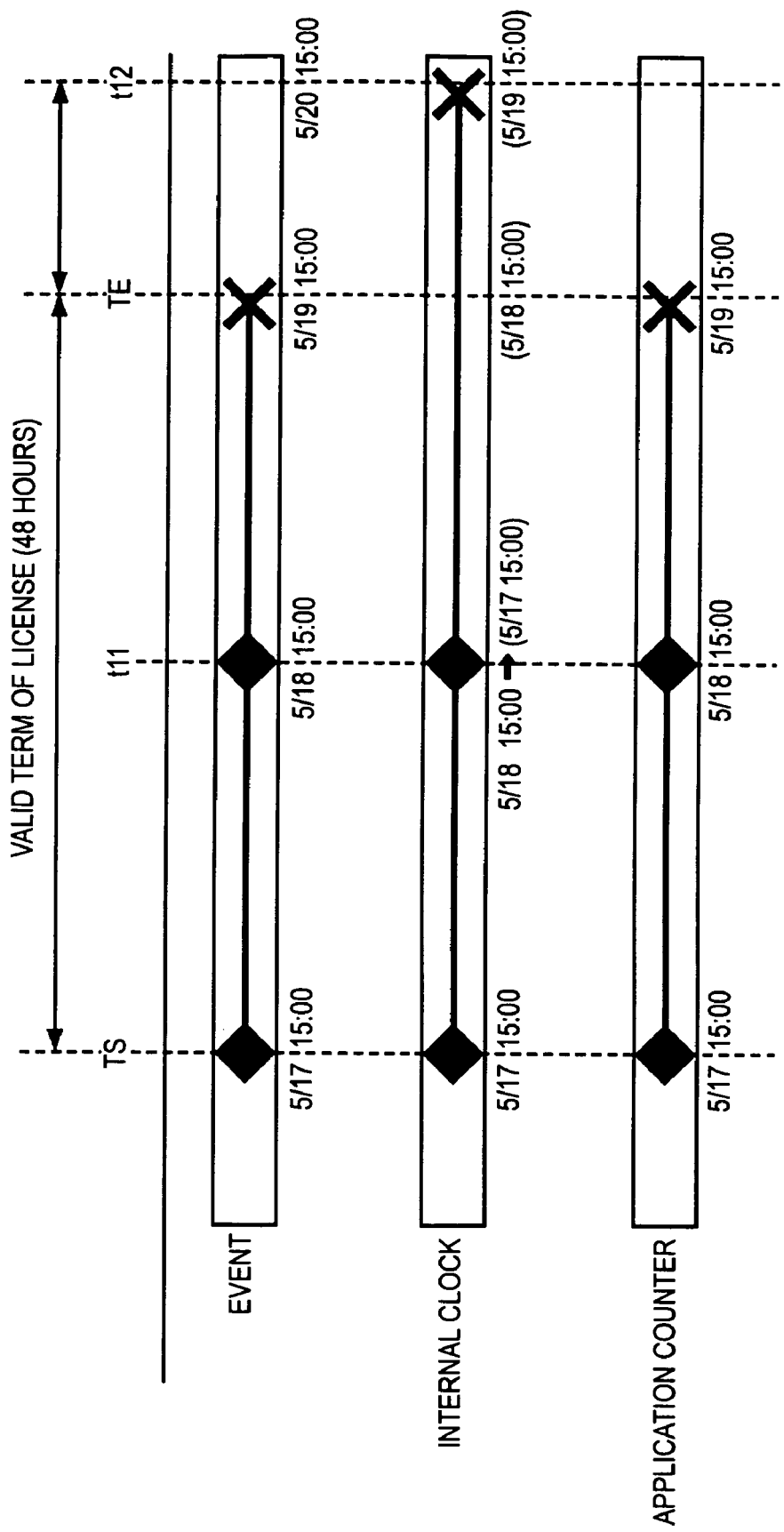
FIG. 9 is a view of assistance in explaining another set of examples of time information in the user terminal in FIG. 1.

In FIGS. 7 to 9, the horizontal axis indicates the elapse of time. The graphs in FIGS. 7 to 9 present in turn from the uppermost: actual time information when an event takes place in the user terminal 1 (i.e. time information that the contents server 3 and license server 4 have); time information of the internal clock 52; and time information of the application counter 84 respectively.

FIG. 7 shows examples of time information of these in the condition where no event takes place (i.e. basic condition) during the valid term of the license information.

Based on a user operation, the following processes are made at the time (date and time) TS when an event takes place (e.g. at 15:00 on May 17) provided that the license of the event is to be purchased (acquired). That is, the time information acquisition section 121 acquires the time information such as NTP on the network 2; based on the acquired time information, the internal time management section 123 and the application counter management section 124 correct (or set) the time information of the internal clock 52 and that of the application counter 84 respectively. Thus, at the time TS, the time information of the internal clock 52 and application counter 84 presents the same time as the actual time information presents (e.g. 15:00 on May 17).

In the example of FIG. 7, any event doesn't take place during the valid term of the license. Therefore, even at the time TE when the term of validity of the license expires, both the internal clock 52 and application counter 84 show the same time as the actual time information (e.g. 15:00 on May 19) presents.

FIG. 8 shows examples of the respective kinds of time information in the case where operations to power on and off the user terminal 1 are performed during the valid term of the license. Here, the power-on and power-off in the example of FIG. 8 (i.e. ON and OFF of the power supply) mean to stop all the power supply to the machine (i.e. to make the power supply mechanically OFF).

At the time TS, namely date and time (e.g. 15:00 on May 17), when an event to purchase (acquire) a license takes place according to a user operation, the time information acquisition section 121 acquires the time information such as NTP on the network 2, and based on the acquired time information, the internal time management section 123 and application counter management section 124 set (correct) the time information of the internal clock 52 and application counter 84 respectively, as in the examples of FIG. 7. Therefore, at the time TS, the time information of the internal clock 52 and application counter 84 show the same time as the actual time information (e.g. 15:00 on May 17).

For instance, in the case where an event to power off the user terminal 1 takes place according to a user operation at the time t1 (18:00 on May 17) 3 hours later than the time TS when the license was purchased, the internal clock 52 continues its clocking operation just like that, whereas the application counter control section 117 terminates the application counter 84 and as such, the time information of the application counter 84 stops at 18:00 on May 17.

Then, at the time t2 (10:00 on May 19) 40 hours later than the power-off time t1 of the user terminal 1, an event to power on the user terminal 1 takes place according to a user operation. At this time, the internal clock 52 continues its clocking operation and as such, the time information of the internal clock 52 shows 10:00 on May 19, whereas the application counter 84 has not been activated yet. Therefore, the time information of the application counter 84 remains stopped at 18:00 on May 17.

After the elapse of a time, at the time t3 (12:00 on May 19) 2 hours later than the time t2 when the user terminal 1 was powered on, an event in which the application counter control section 117 activates the application counter 84 according to a user operation takes place.

At this time, the time-judging section 122 continues its clocking operation and compares the time information of the internal clock 52 showing 12:00 on May 19 with the time information of the application counter 84 that remains stopped at 18:00 on May 17. Then, when the time-judging section 122 judges that the time information of the internal clock 52 is in advance of the time information of the application counter 84, it controls the application counter management section 124, whereby the time information of the application counter 84 is corrected so as to coincide with the time information of the internal clock 52.

As a result, it becomes possible that the internal clock 52 and the application counter 84 present the same time as that the actual time information (e.g. 15:00 on May 19) shows at the time TE when the term of validity of the license expires.

However, in the case where at the time of activating the application counter 84, the time information of the application counter 84 is in advance of the time information of the internal clock 52, the time information of the internal clock 52 is regarded as having been doctored. In that case, the time information of the application counter 84 is not made to coincide with the time information of the internal clock 52.

FIG. 9 shows examples of the respective kinds of time information in the case where the user doctors the time information of the internal clock 52 in the valid term of the license.

At the time (date and time) TS (e.g. 15:00 on May 17), when an event to purchase (acquire) a license takes place according to a user operation, the time information acquisition section 121 acquires the time information such as NTP on the network 2; and based on the acquired time information, the internal time management section 123 and application counter management section 124 correct the time information of the internal clock 52 and application counter 84 respectively, as in the examples of FIG. 7. Therefore, at the time TS, the time information of the internal clock 52 and application counter 84 show the same time as the actual time information (e.g. 15:00 on May 17).

For instance, at the time t11 (15:00 on May 18) 24 hours later than the time TS when the license was purchased, the user causes an event to delay (i.e. doctor) the time information of the internal clock 52 of the user terminal 1, for example, to 15:00 on May 17. According to the user operation, the internal time management section 123 changes the time information of internal clock 52 from 15:00 on May 18, the actual time information, to 15:00 on May 17.

Then, at a certain time after the time t11, the time-judging section 122 compares the time information of the internal clock 52 with the time information of the application counter 84. Now, the certain time after the time t11 may be when a content is produced, or may be a time after a given length of time has elapsed, at which the time-judging section 122 is performing a judging process on the internal clock 52 for the comparison.

When the time-judging section 122 judges from the time information of the application counter 84 that the time information of the internal clock 52 delays, it regards the time information of the internal clock 52 as having been doctored, and then directs the reproduction control section 111 to refer to the clock information of the application counter 84. Incidentally, at this time, the time information of the internal clock 52 may be changed so as to equal the time information of the application counter 84.

Therefore, at the time TE when the term of validity of the license expires, the time information of the internal clock 52 is going to show 15:00 on May 18. However, the reproduction control section 111 refers to the time information of the application counter 84 showing the same time as the actual time information (e.g. 15:00 on May 19) and as such, it becomes difficult to reproduce the contents after the time TE when the term of validity of the license expires.

In other words, the reproduceable term of the contents could be illegally extended to the time t12 (i.e. 15:00 on May 20 based on the actual time information) when the term of validity of the license expires, which the doctored time information of the internal clock 52 shows, however the contents can be reproduced only until the time (15:00 on May 19) based on the time information of the application counter 84, at which the term of validity of the license expires actually.

As described above, even when the time information of the internal clock 52 is doctored, illegal reproduction of contents data can be inhibited by comparing the time information of the internal clock 52 with the time information of the application counter 84, and correcting (setting) the time information or changing the time information for reference.

The comparison of time information of the internal clock 52 and the application counter 84 is useful especially when it is difficult to acquire the time information such as NTP on the network 2 because the user terminal doesn't connect with the network 2.

Now, a process by the license server 4 will be described in reference to the flow chart of FIG. 10.

Figure 14:
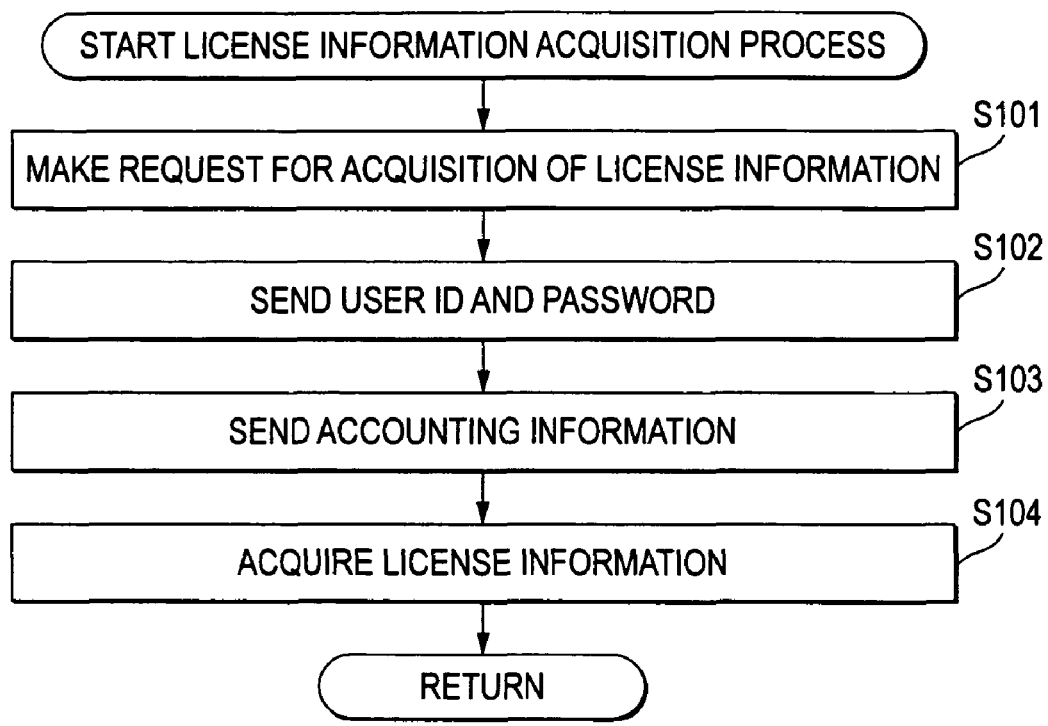
FIG. 14 is a flow chart of assistance in explaining a license acquisition process of Step S39 in FIG. 11.

When a user operates the input section 36 to direct the reproduction of contents, if the license information of the targeted contents is not stored in the user terminal 1, the user terminal 1 makes a request for acquisition of the license information at Step S101 of FIG. 14 that is to be described later.

The accounting management section 23 judges whether or not a request for acquisition of license information has been made at Step S1. When the accounting management section 23 receives the request for acquisition of license information from the user terminal 1 and judges at Step S11 that the request for acquisition of license information has been made, the process proceeds to Step S12. At Step S12, the certification section 22 is controlled and made to judge whether or not the user terminal 1 has been authenticated. When it is judged that the user terminal 1 has not been authenticated, the process proceeds to Step S13. At Step S13, the Web server 21 is controlled, and made to send the login (authentication) screen data for utilizing the contents-providing system, i.e. to request a user ID and a password, and then the process proceeds to Step S14.

In response to the action, the user ID and password are sent from the user terminal 1 at Step 102 of FIG. 14 that is to be described later.

At Step S14, the certification section 11 refers to the information registered in the membership database 25, authenticates the user terminal 1 with the user ID and password, and supplies the result of authentication to the accounting management section 23. Then, the process proceeds to Step S15.

Incidentally, when it is judged at the Step S12 that the user terminal 1 has been authenticated, Steps S13 and S14 are skipped, and the process proceeds to Step S15.

At Step S15, the accounting management section 23 makes a request to the user terminal 1 for accounting information in association with license information of the contents for which a request has been made at Step S11, and then the process proceeds to Step S16.

In response to the action, at Step S103 of FIG. 14 to be described later, the accounting information is sent from the user terminal 1. At Step S16, the accounting management section 23 judges whether or not the accounting information from the user terminal 1 has been received. When receiving the accounting information from the user terminal 1, the accounting management section 23 judges at Step S16 that the accounting information from the user terminal 1 has been received. Then, the process proceeds to Step S17. At Step S17, the license-issuing section 151 is controlled and made to issue the license information to the user terminal 1. Then, the process proceeds to Step S18.

In other words, the license-issuing section 151 issues at Step S17 the license information to the user terminal 1, and then registers the issued license information in the contents license database 26 and supplies the license information to the contents list register section 152. Then, the process proceeds to Step S18.

At Step S18, the contents list register section 152 additionally registers a corresponding contents list in the contents list storage section 153 based on the license information from the license-issuing section 151. Then, the process proceeds to Step S19.

On the other hand, when it is judged at Step S11 that no request for license information has been made, Steps S12 to S18 are skipped, and the process proceeds to Step S19. Also, when it is judged at Step S16 that no accounting information has been received, Steps S17 and S18 are skipped, and the process proceeds to Step S19.

At Step S19, the contents list update section 154 refers to the time information of its internal clock, compares the current time with an expiring date in the contents list storage section 153 thereby to judge whether or not there is an expired contents. In the case where it is judged that an expired contents exists, the process proceeds to Step S20. At Step S20, the contents list update section 154 sets a watching-and-listening flag of the expired contents to WATCHING- AND/OR LISTENING-UNAUTHORIZED (turns off the watching-and-listening flag showing WATCHING- AND/OR LISTENING-AUTHORIZED). Then, the process is returned to Step S11, and then process steps following Step S11 are repeated.

Also, when it is judged at Step S19 that there is no expired contents list, the process of Step S20 is skipped and the process is returned to Step S11. Then, the process steps following Step S11 are repeated.

As described above, the license server 4 makes a judgment concerning the term of validity of the license based on its own time information, and sets a watching-and-listening flag of an expired contents list to WATCHING- AND/OR LISTENING-UNAUTHORIZED, and therefore it becomes possible to inhibit reproduction of an expired content by making the user terminal 1 check the watching-and-listening flag necessarily when a content is reproduced in the user terminal 1, which is to be described later.

Now, a contents reproduction process by the user terminal 1 will be described in reference to the flow chart of FIG. 11. A user operates a mouse or the like of the input section 36 to direct reproduction of contents stored in, for example, the contents data storage section 81.

Figure 11:
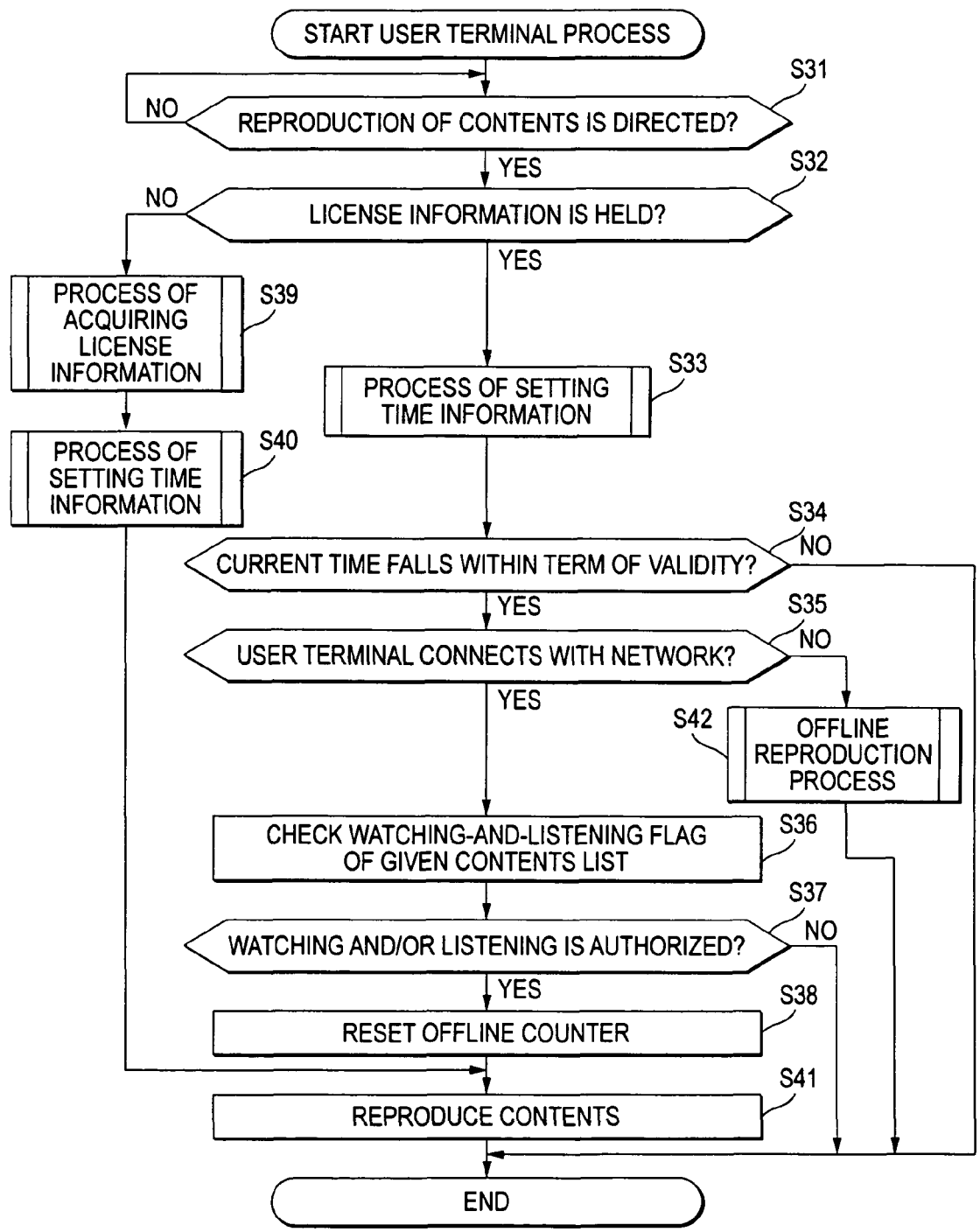
FIG. 11 is a flow chart of assistance in explaining a contents reproduction process in the user terminal in FIG. 1.

At Step S31 of FIG. 11, the reproduction control section 111 is on standby until reproduction of contents is directed. When it is judged that reproduction of contents has been directed, in response to an operation signal from the input section 36 corresponding to a user operation, the process proceeds to Step S32. At Step S32, the contents license management section 65 is made to retrieve the license information of contents to be reproduced from the license information storage section 82. Based on the result of the retrieval, it is judged whether or not the user terminal 1 has the license information of the targeted contents. When it is judged that the user terminal 1 has the license information of the targeted contents, the process proceeds to Step S33.

At Step S33, the reproduction control section 111 controls the time-judging section 122, and makes the time-judging section execute a time information setting process. Then, the process proceeds to Step S34. While details of the time information setting process at Step S33 is to be described later in reference to the flow chart of FIG. 13, the time information setting process includes: comparing the time information of the internal clock 52 with the time information of the application counter 84; and based on the result of the comparison, setting the time information of either the internal clock 52 or the application counter 84 as the time information that the reproduction control section 111 refers to.

At Step S34, the reproduction control section 111 refers to the clock (internal clock 52 or application counter 84) that has been set at Step S33 and judges whether or not the current time falls in the term of validity of the license information. When it is judged that the current time falls in the term of validity of the license information, the process proceeds to Step S35. At Step S35, the reproduction control section 111 controls the connection-judging section 114 and makes the connection-judging section judge whether or not the user terminal 1 connects with the network 2.

When it is judged at Step S35 that the user terminal 1 connects with the network 2, the reproduction control section 111 advances to Step S36. At the step, the reproduction control section controls the watching-and-listening flag-checking section 115 and makes the section 115 check a watching-and-listening flag in a contents list corresponding to a desired content, of contents lists in the license management section 24 of the license server 4 and the process proceeds to Step S37. Then, at Step S37, it is judged whether or not the watching-and-listening flag of the desired content is WATCHING- AND/OR LISTENING-AUTHORIZED.

More specifically, at Step 36 the watching-and-listening flag-checking section 115 accesses the license management section 24 of the license server 4 through the license acquisition interface 74, checks a watching-and-listening flag of the desired contents list as described above in reference to FIG. 6, and supplies the result of the check to the reproduction control section 111. In response to this, the reproduction control section 111 judges at Step S37 whether or not the watching-and-listening flag of the desired content is WATCHING- AND/OR LISTENING-AUTHORIZED. When it is judged that the watching-and-listening flag of the desired content is WATCHING- AND/OR LISTENING-AUTHORIZED, the reproduction control section 111 advances to Step S38 to reset the count value of the offline counter 116. Then, the process proceeds to Step S41.

Also, at Step S32, when it is judged that the user terminal 1 doesn't have the license information of the targeted contents, the reproduction control section 111 advances to Step S39. At Step S39, the reproduction control section 111 controls the authentication control section 112 and the license acquisition control section 113 to make them execute a license information acquisition process, and then advances to Step S40. While the license information acquisition process at Step S39 is to be described in detail in reference to the flow chart of FIG. 14, the license information of the targeted contents is acquired from the license server 4 in the license information acquisition process.

At Step S40, the reproduction control section 111 controls the time information acquisition section 121, makes the time information acquisition section execute the time information setting process, and then advances to Step S41. While details of the time information setting process at Step S40 are to be described later in reference to the flow chart of FIG. 15, in the time information setting process time information such as NTP on the network 2 is acquired, and the time of the internal clock 52 and the time of the application counter 84 are corrected (set) based on the acquired time information.

At Step S41, the reproduction control section 111 uses the license information acquired by the license acquisition control section 113 or the license key of the license information acquired by the contents license management section 65 to decode the contents data, reproduces the decoded contents data, controls the GUI control section 62, makes the monitor constituting the output section 37 display an image corresponding to the contents data, and then terminates the contents reproduction process.

Thus, an image corresponding to the contents data from the reproduction control section 111 is displayed on the monitor that constitutes the output section 37, provided that the display of the image is controlled by the GUI control section 62.

However, when it is judged at Step S34 that the current time doesn't fall in the term of validity of the license information, or when it is judged at Step S37 that a watching-and-listening flag of the desired contents list is WATCHING- AND/OR LISTENING-UNAUTHORIZED, the reproduction of the contents is not permitted and as such, the reproduction is not performed (i.e. reproduction is forbidden), and the contents reproduction process is terminated. Incidentally, in such case, the offline counter 116 is not reset, too.

Further, when it is judged at Step S35 that the user terminal 1 doesn't connect with the network 2, the reproduction control section 111 advances to Step S42, and executes an offline reproduction process. The offline reproduction process will be described in reference to the flow chart of FIG. 12.

At Step S61 of FIG. 12, the reproduction control section 111 judges whether or not the counter value of the offline counter 116 is less than or equal to the number of times that the license information can be utilized offline. When it is judged that the counter value of the offline counter 116 is less than or equal to the number of times that the license information can be utilized offline, the reproduction control section 111 advances to Step S62. At Step S62, the reproduction control section 111 causes the offline counter 116 to count once, thereby to increment its counter value by one. Then, the process proceeds to Step S63.

At Step S63, the reproduction control section 111 uses the license key of the license information acquired by the contents license management section 65 to decode the contents data, reproduces the decoded contents data, controls the GUI control section 62, makes the monitor constituting the output section 37 display an image corresponding to the contents data, returns to Step S42 of FIG. 11, and then terminates the contents reproduction process.

Thus, an image corresponding to the contents data from the reproduction control section 111 is displayed on the monitor that constitutes the output section 37, provided that the display of the image is controlled by the GUI control section 62.

However, at Step S61, when it is judged that the counter value of the offline counter 116 is not less than or equal to the number of times that the license information can be utilized offline (i.e. the counter value exceeds the number), the reproduction of contents is not permitted and as such, the reproduction is not performed (i.e. reproduction is forbidden), and the offline reproduction process is terminated. Then, the process is returned to Step S42 of FIG. 11, and therefore the contents reproduction process is terminated.

With the example of FIG. 11, the case of reproducing contents data stored in the contents data storage section 81 has been described, in which, for example, when the reproduction of contents stored in the contents storage section 11 of the contents server 3 has been directed at Step S31, the contents data is acquired from the contents server 3 through the contents download interface 72 and stored in the contents data storage section 81 by the contents license management section 65, before the process steps following Step S32 are executed.

As described above, by checking not only the setting of the time information in the user terminal 1 but also a watching-and-listening flag in a contents list in the license server 4 in the case of the user terminal connecting with the network 2 on line, it becomes possible to inhibit illegal reproduction of contents even when doctoring of time information in the user terminal 1 cannot be prevented.

Also, in the case where the user terminal doesn't connect with the network 2 offline, it becomes difficult to reproduce contents over the number of times that the contents can be utilized offline if the user terminal doesn't connect with the network 2 and as such, the number of times that illegal reproduction of a content can be minimized (inhibited) even when doctoring of time information in the user terminal 1 cannot be prevented. This is because the license information contains the number of times that the license information can be utilized offline.

Now, details of the time information setting process at Step S33 of FIG. 11 will be described in reference to the flow chart of FIG. 13.

Figure 13:
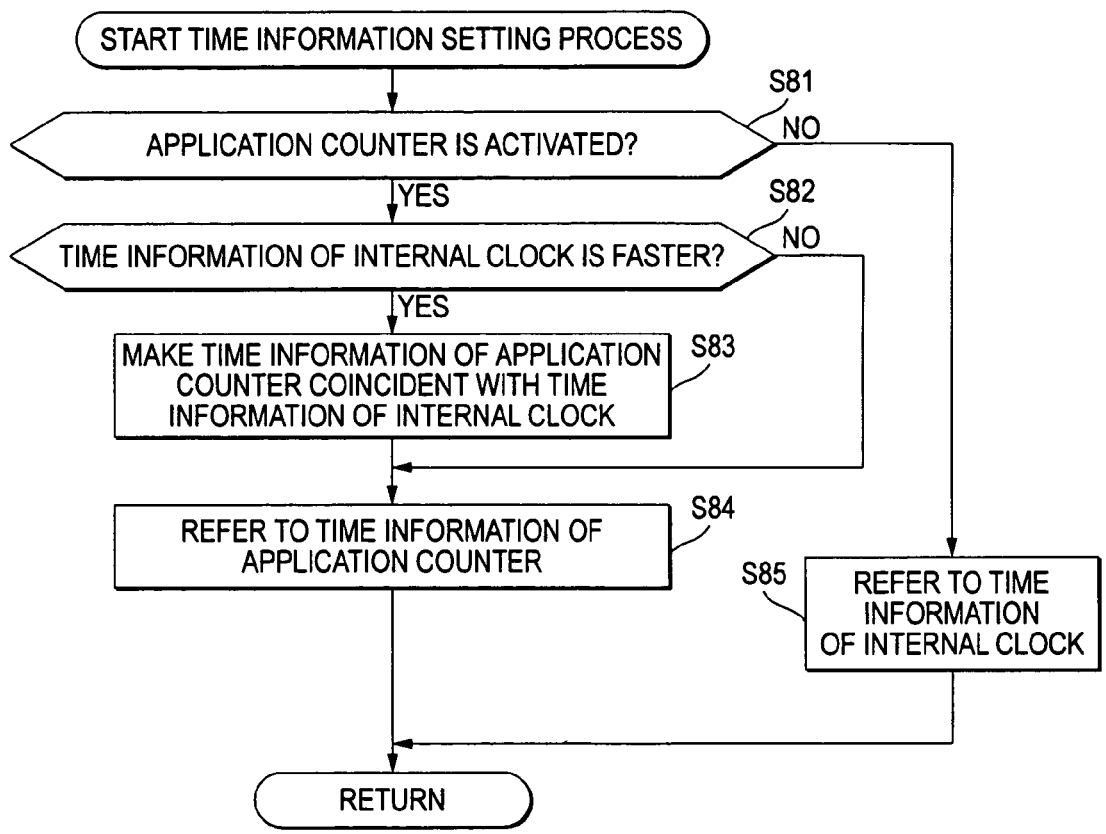
FIG. 13 is a flow chart of assistance in explaining a time information setting process of Step S33 in FIG. 11.

At Step S81 of FIG. 13, the time-judging section 122 judges whether or not the application counter 84 is activated. When it is judged that the application counter 84 is activated, the process proceeds to Step S82. Then, the time-judging section 122 compares the time information of the application counter 84 with that of the internal clock 52, whereby judging whether or not the time information of the internal clock 52 is faster than that of the application counter 84.

When it is judged at Step S82 that the time information of the internal clock 52 is faster than that of the application counter 84, the time-judging section 122 advances to Step S83. At Step S83, the time-judging section 122 controls the application counter management section 124, makes the section 124 correct (set) the application counter 84 so that the application counter 84 coincides in time information with the internal clock 52, and then advances to Step S84.

Now, when it is judged at Step S82 that the time information of the internal clock 52 is not faster than that of the application counter 84, the time information of the internal clock 52 can be doctored and as such, Step S83 is skipped. The process proceeds to Step S84.

At Step S84, the time-judging section 122 controls the reproduction control section 111 so that the section 111 refers to the time information of the application counter 84, and terminates the time information setting process. Then, the process returns to Step S33 of FIG. 11 and then proceeds to Step S34.

However, when it is judged at Step S81 that the application counter 84 is not activated, the time-judging section 122 advances to Step S85. At Step S85, the time-judging section 122 controls the reproduction control section 111 so that the section 111 refers to the time information of the internal clock 52 and terminates the time information setting process. Then, the process returns to Step S33 of FIG. 11 and then proceeds to Step 34.

In the example of FIG. 13, it has been described that when the time information of the application counter 84 is faster than that of the internal clock 52, the reproduction control section 111 is made to refer to the time information of the application counter 84 without correcting the application counter 84 in time information. The reproduction control section 111 may be made to refer to the time information of the internal clock 52 with the internal clock 52 set so as to coincide in time information with the application counter 84, instead.

As described above, the time information of the application counter 84 is compared with that of the internal clock 52, and the setting of time information is made in reference to one of the internal clock 52 or application counter 84, which is faster or more reliable than the other. This makes it possible to inhibit the extension of the term of validity of license owing to doctoring the time information of the internal clock 52.

Now, details of the license information acquisition process at Step S39 of FIG. 11 will be described in reference to the flow chart of FIG. 14. In the example of FIG. 14, the case where the certification section 22 of the license server 4 has not authenticated the user terminal 1 will be described.

At Step S101, the license acquisition control section 113 makes a request for acquisition of license information to the license server 4 through the license acquisition interface 74 and then advances to Step S102.

Figure 10:
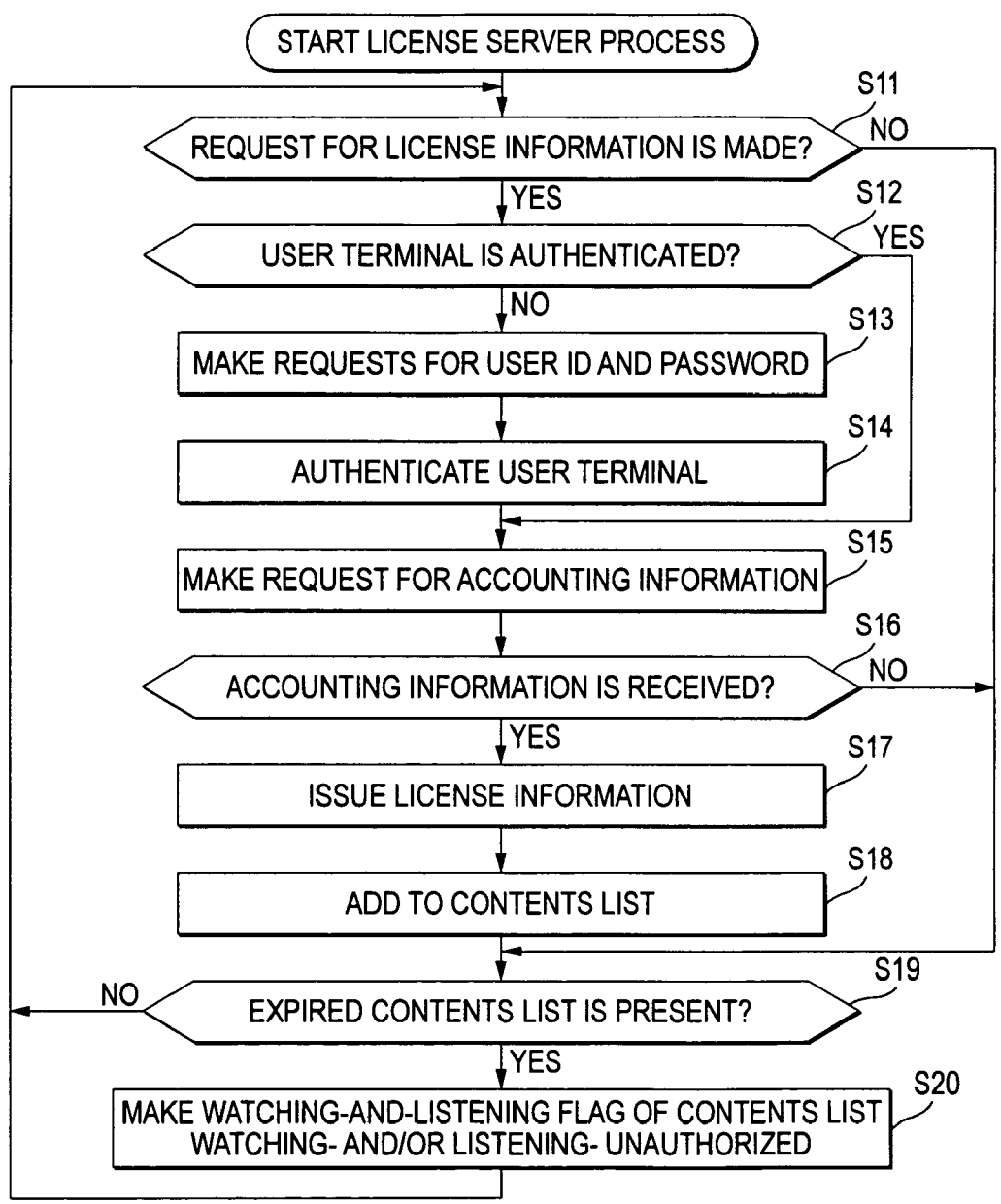
FIG. 10 is a flow chart of assistance in explaining a process in a license server in FIG. 1.

The user terminal 1 has not been authenticated yet by the certification section 22 and as such, at Step S13 of FIG. 10 login (authentication) screen data to utilize the contents-providing system is sent from the Web server 21 of the license server 4.

On receipt of the login screen data, the Web interface 71 supplies the received login screen data to the GUI control section 62 through the system control section 61. The GUI control section 62 makes the monitor constituting the output section 37 display an image corresponding to the login screen data supplied from the Web interface 71. A user operates a keyboard of the input section 36 or the like to input a user ID and a password while seeing the login screen displayed on the monitor.

At Step S102, the reproduction control section 111 controls the authentication control section 112 and makes the section 112 send the license server 4 the user ID and password, which are input through the input section 36, through the network 2. Then, the process proceeds to Step S103.

The license server 4 uses the user ID and password from the user ID-sending section 112 to execute a user authentication process. When the user ID is authenticated, the accounting information for the license information requested at Step S101 is requested (Step S15 of FIG. 10).

When receiving a request for accounting information from the license server 4, the license acquisition control section 113 controls the GUI control section 62 and makes the section 62 display the request for accounting information from the license server 4 on the monitor that constitutes the output section 37. Then, the user checks the display on the monitor and operates the keyboard or mouse included in the input section 36 to direct the sending of the accounting information and as such, the GUI control section 62 supplies the direction to send the accounting information to the license acquisition control section 113.

At Step S103, the license acquisition control section 113 sends the accounting information corresponding to the request from the license server 4 to the license server 4 through the license acquisition interface 74, and then advances to Step S104.

When receiving the accounting information from the user terminal 1, the accounting management section 23 of the license server 4 controls the license management section 24 and makes the section 24 issue the license information at Step S17 of FIG. 10.

At Step 104, the license acquisition control section 113 acquires the license information issued by the license server 4 through the license acquisition interface 74, and supplies it to the reproduction control section 111. Then, the license information acquisition process is terminated, and the process returns to Step S39 of FIG. 11 and proceeds to Step S40.

When the certification section 22 has already authenticated the user terminal 1 before the license acquisition process, Step S102 is skipped.

Figure 15:
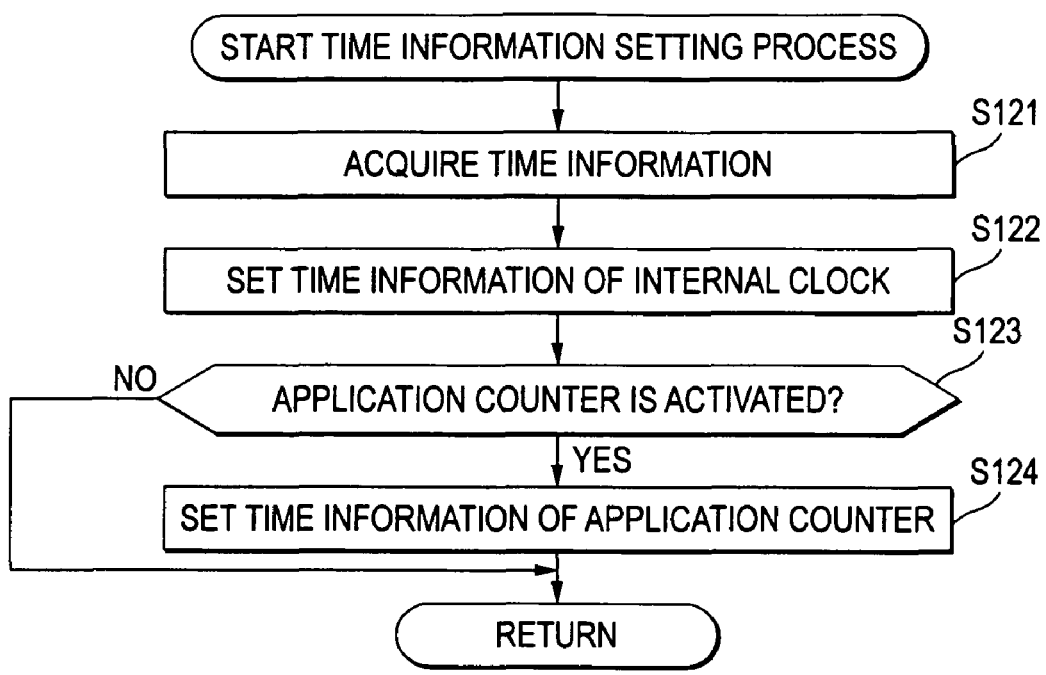
FIG. 15 is a flow chart of assistance in explaining a time information setting process of Step S40 in FIG. 11.

Now, details of the time information setting process at Step S40 of FIG. 11 will be described in reference to the flow chart of FIG. 15. The example of the time information setting process of FIG. 15 is a modification of the time information setting process of the FIG. 13. Therefore, at Step S40 of FIG. 11 the time information setting process of FIG. 13 may be executed, and at Step S33 of FIG. 11 the time information setting process of FIG. 15 may be executed.

At Step S121 of FIG. 15, the time information acquisition section 121 connects with the network 2 through the license acquisition interface 74, acquires the time information such as NTP on the network 2, supplies the acquired time information to the internal time management section 123 and the application counter management section 124, and then advances to Step S122.

At Step S122, the internal clock management section 123 sets the time information of the internal clock 52 so that it coincides with the time information supplied from the time information acquisition section 121. Then, the process proceeds to the Step S123.

At Step S123, the application counter management section 124 judges whether or not the application counter 84 is activated. When it is judged that the application counter 84 is activated, the application counter management section 124 advances to Step S124, and sets the time information of the application counter 84 so that it coincides with the time information supplied from the time information acquisition section 121. Then, the time information setting process is terminated, and the process returns to Step S40 of FIG. 11 and proceeds to Step S41.

Also, when the application counter management section 124 judges at Step S123 whether or not the application counter 84 is activated and then it is judged that the application counter 84 is not activated, Step S124 is skipped and the time information setting process is terminated. Then, the process returns to Step S40 of FIG. 11 and proceeds to Step S41.

As described above, the time information of the internal clock 52 and application counter 84 is made to coincide with the time information such as NTP on the network 2 when the license information is acquired and as such, even after the time information of the internal clock 52 has been doctored, the time information can be corrected to a right information. Therefore, it is possible to inhibit the extension of the term of validity of license information owing to doctoring the time information.

Figure 16:
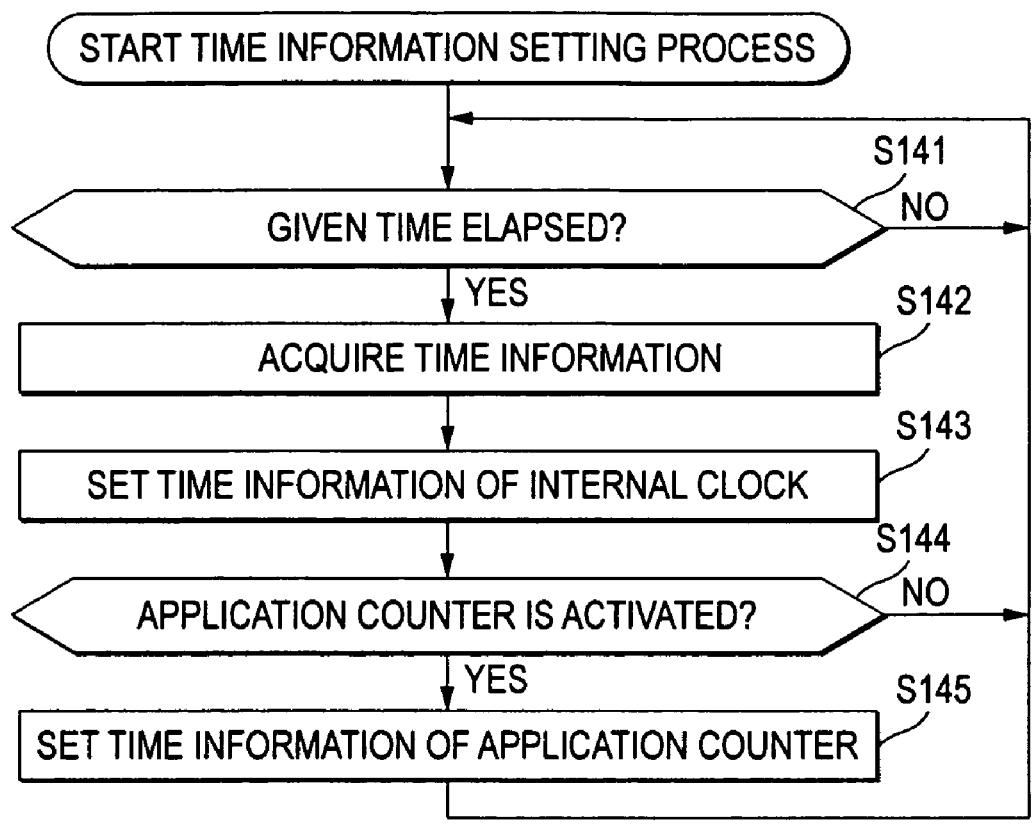
FIG. 16 is a flow chart of assistance in explaining an alternative of the time information setting process in the user terminal in FIG. 1.

Incidentally, the time information setting process may be carried out not only when license information is acquired but also periodically as shown by FIG. 16.

Now an example of the time information setting process periodically executed will be described in reference to the flow chart of FIG. 16. Incidentally, the processes of Steps S142 to S145 of FIG. 16 are basically the same as those of Steps S121 to S124 of FIG. 15.

During Step S141 of FIG. 16, the time information acquisition section 121 monitors the time information of the internal clock 52 and is on standby until a given length of time has elapsed. At Step S141, when it is judged based on the time information of the internal clock 52 that the given length of time has elapsed, the time information acquisition section 121 advances to Step S142. At Step S142, the time information acquisition section 121 is controlled and made to connect with the network 2 through the license acquisition interface 74 and to acquire the time information such as NTP on the network 2. The acquired time information is supplied to the internal time management section 123 and the application counter management section 124. Then, the process proceeds to Step S143.

At Step S143, the internal clock management section 123 sets the time information of the internal clock 52 so that it coincides with the time information supplied from the time information acquisition section 121. Then, the process proceeds to Step S144.

At Step S144, the application counter management section 124 judges whether or not the application counter 84 is activated. When it is judged that the application counter 84 is activated, the application counter management section 124 advances to Step S145. At Step S145, the time information of the application counter 84 is set so that it coincides with the time information supplied from the time information acquisition section 121. Then, the process returns to Step S141, the processes after the step are repeated.

Also, at Step S144, when the application counter management section 124 judges whether or not the application counter 84 is activated and then it is judged that the application counter 84 is not activated, Step S145 is skipped and the time information setting process is terminated. Then, the process returns to Step S141 and the processes after the step are repeated.

As described above, the time information of the internal clock 52 and application counter 84 is periodically made to coincide with the time information such as NTP on the network 2 and as such, illegal extension of a contents-reproduceable term owing to doctoring the time information of the internal clock 52 can be inhibited as far as possible.

Figure 17:
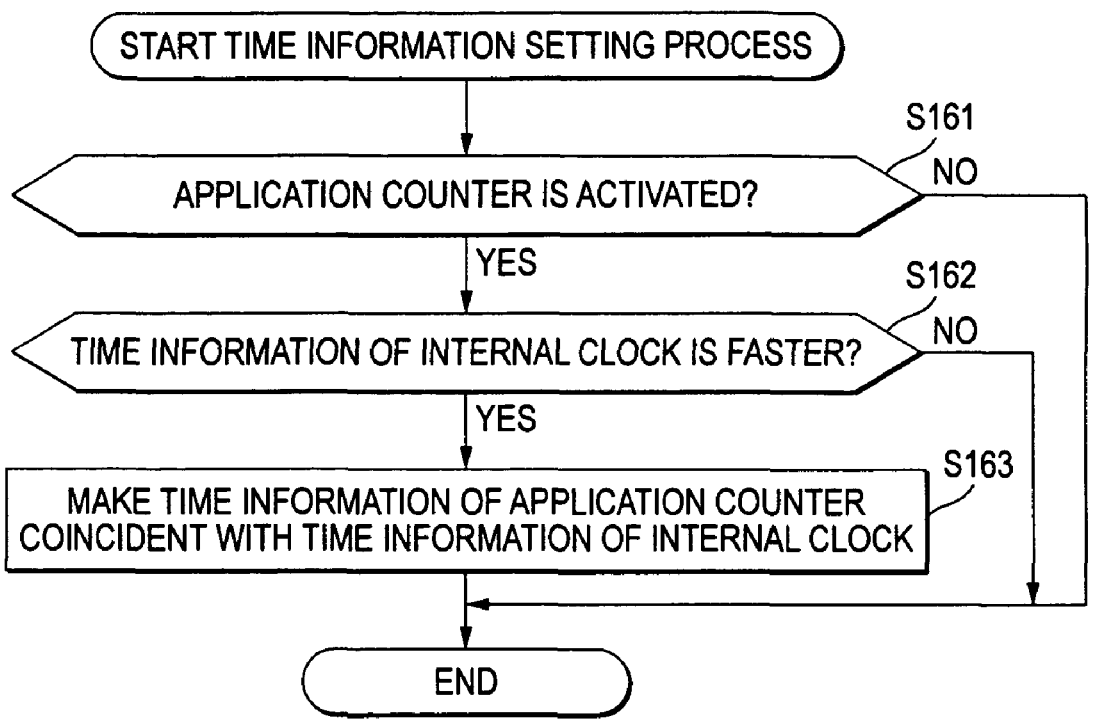
FIG. 17 is a flow chart of assistance in explaining an alternative of the time information setting process in the user terminal in FIG. 1.

Now, a modification of the time information setting process in the user terminal 1 will be described in reference to the flow chart of FIG. 17. When the application counter 84 is activated, the time information of the application counter 84 is set in reference to the time information such as NTP on the network 2 as described above in reference to FIGS. 15 and 16. However, when the application counter 84 is stopped, it remains holding the time information at the time when it is stopped.

Therefore, at Step S161 the time-judging section 122 monitors the application counter 84 and is on standby until the application counter 84 is activated. The application counter control section 117 activates the application counter 84 according to an operation signal corresponding to an operation by the user A or the direction from OS (Operating System) of the user terminal 1.

When the time-judging section 122 judges at Step S161 that the application counter 84 is activated, it advances to Step S162. At Step S162, the time-judging section 122 compares the time information of the application counter 84 with that of the internal clock 52, thereby to judge whether or not the time information of the internal clock 52 is faster than that of the application counter 84.

When it is judged at Step S162 that the time information of the internal clock 52 is faster than that of the application counter 84, the time-judging section 122 advances to Step S163. At the step, the application counter management section 124 is controlled and made to set the time information of the application counter 84 so that the application counter 84 coincides in time information with the internal clock 52. Then, the time information setting process is terminated.

Also, when it is judged at Step S162 that the time information of the internal clock 52 is not faster than that of the application counter 84, the time information setting process is terminated without correcting the time information of the application counter 84.

That is, when it is judged that the time information of the internal clock 52 is not faster than that of the application counter 84, the time information of the internal clock 52 can be doctored and as such. On this account, the application counter 84 is not made to coincide with the internal clock 52 in time information, and its time information is made to agree with the time information such as NTP on the network 2 when the time information setting process of FIG. 16 is executed.

As described above, in the user terminal 1 the time information such as NTP on the network 2 is acquired periodically or when license information is acquired to make the time information of the internal clock 52 or application counter 84 coincide with the acquired time information and as such, the time information of the internal clock 52 can be frequently corrected even when it is doctored.

In addition, the time information of the internal clock 52 is compared with that of the application counter 84 to make one of them coincide with the other that is faster in time information than the one or to avoid referring to the delayed one. This can inhibit the time information from being doctored between the time information setting processes executed periodically and off line.

Further, in the case where the user terminal 1 connects with the network 2, a watching-and-listening restriction flag in a contents list in the license server 4 is checked in reproducing contents and as such., illegal reproduction of contents can be inhibited even if the application counter 84 is stopped and the time information of the internal clock 52 in the user terminal 1 is doctored.

In the case where the user terminal is off line, utilizing-limit data at the time of offline is added to the license information, and the number of times of reproduction or the length of time of reproduction is counted each time a content is reproduced offline. Hence, even if the utilizing-time limit of license information is illegally extended offline by doctoring the time information, the extension can be kept from exceeding the utilizing limit, i.e. the illegal extension can be minimized.

As described above, illegal use of contents can be inhibited regardless of online or offline by a combination of the above ways to inhibit time information from being doctored in the user terminal 1 and the license server 4.

While it has been described above that the license server 4 manages a contents list that includes a watching-and-listening restriction flag, such contents list may be managed by the contents server 3. Also, it has been described that the license information contains contents-utilizing limits at the time of offline. However, the metadata to be added to contents may contain such contents-utilizing limits at the time of offline.

In addition, the above description has been presented with moving image and music contents as examples. However, the invention is not limited to moving image and music contents, it can be applied to other contents including application software.

A series of processes described above may be executed by hardware or software.

In the case where the series of processes are executed by software, the programs that constitute the software are installed through a network or a recording medium on a computer incorporated in a dedicated piece of hardware or e.g. a multipurpose personal computer that can execute various functions when various kinds of programs are installed thereon.

As shown in FIG. 2, such recording medium may be one of or a combination of: a magnetic disk 41 with the programs recorded therein (including a flexible disk); an optical disk 42 (including a CD-ROM(Compact Disk-Read Only Memory) and a DVD (Digital Versatile Disk)); an optical magnetic disk 43 (including MD(Mini-Disk) (TM)); and a package medium constructed of a semiconductor memory 44, etc., which can be distributed in order to provide a user with the programs independently of a machine body. Alternatively, the recording medium may be a ROM 32 with the programs recorded therein or a hard disk included in the storage section 38, which can be previously incorporated in a machine body and provided to a user in this condition.

The steps shown in the flow charts hereof include processes that are not necessarily handled in time sequence, but carried out in parallel or individually as well as processes performed in time sequence following the order described herein.

It should be noted that "system" herein means an entire organization constructed of two or more devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
a first information processing device; and
a second information processing device operable to communicate with said first information processing device through a network;
said first information processing device having,
    a license information-sending unit that sends license information containing utilizing-time limit information for utilizing a content in response to a request from said second information processing device; and
said second information processing device having,
    a license information-receiving unit that receives the license information sent by said license information-sending unit,
    an interface that acquires time information through the network,
    an internal clock-setting unit that refers to the time information acquired by said interface to set time information of a built-in internal clock, and
    a microprocessor configured to control a utilization of the content, which the license information received by said license information-receiving unit targets, based on the time information of said built-in internal clock set by said internal clock-setting unit or time information of a counter working independently of said built-in internal clock;
    a flag-checking unit configured to receive, from said first information processing device, a contents playback-authorizing flag showing whether the utilization of the content is available when the utilization of the content is directed, said microprocessor exercising a control to forbid the utilization of the content wherein when the contents playback-authorizing flag shows that the utilization of the content is not available;
    a time judging unit configured to judge whether the time information of said built-in internal clock is faster than the time information of said counter; and
    a counter-setting unit configured to set the time information of said counter to coincide with the time information of said built-in internal clock when said time-judging unit judges that the time information of said built-in internal clock is faster than the time information of said counter.

2. An information processing device operable to receive information for utilizing a content from a different information processing device through a network, the information processing device comprising:
    an interface that receives license information containing utilizing-time limit information for utilizing the content from said different information processing device;
    a time information acquisition unit that acquires time information through the network;
    an internal clock-setting unit that refers to the time information acquired by said time information acquisition unit to set time information of a built-in internal clock; and
    a microprocessor configured to control a utilization of the content, which the license information received by said interface targets, based on the time information of said built-in internal clock set by said internal clock-setting unit or time information of a counter working independently of said built-in internal clock;
    a time-judging unit configured to judge whether the time information of said built-in internal clock is faster than the time information of said counter;
    a counter-setting unit configured to set the time information of said counter to coincide with the time information of said built-in internal clock when said time-judging unit judges that the time information of said built-in internal clock is faster than the time information of said counter;
    a flag-checking unit configured to receive, from said different information processing device, a contents playback-authorizing flag showing whether the utilization of the content is available, when the utilization of the content is directed, wherein when the contents playback-authorizing flag shows that the utilization of the content is not available, said microprocessor exercises a control to forbid the utilization of the content.

3. The information processing device of claim 2, wherein the license information contains a utilizing-limit datum for utilizing the content offline, the information processing device further comprising:

a number-of-utilizations-counting unit that counts a number of times that the content is utilized when said microprocessor controls an offline utilization of the content; and a utilizing-limit-judging unit configured to judge whether the number of times counted by said number-of-utilizations-counting unit is equal to or less than the utilizing-limit datum when the offline utilization of the content is directed, said microprocessor exercising a control to forbid the offline utilization of the content when said utilizing-limit-judging unit judges that the number of times is above the utilizing-limit datum.

4. The information processing device of claim 3, wherein said number-of-utilizations-counting unit resets the number of times when the contents playback-authorizing flag shows that the utilization of the content is available.

5. A computer-readable, non-transitory storage medium including a program that, when executed by a computer, causes the computer to execute a process to receive information for utilizing a content from an information processing device through a network, the process comprising:

receiving license information containing utilizing-time limit information for utilizing the content from the information processing device;

acquiring time information through the network;

referring to the time information acquired in the acquiring to set time information of a built-in internal clock;

controlling, with the computer, a utilization of the content, which the license information received in the receiving targets, based on the time information of the built-in internal clock or time information of a counter working independently of the built-in internal clock;

receiving, from said information processing device, a contents playback-authorizing flag showing whether the utilization of the content is available, when the utilization of the content is directed;

forbidding the utilization of the content, when the contents playback-authorizing flag shows that the utilization of the content is not available;

judging whether the time information of said built-in internal clock is faster than the time information of said counter; and setting the time information of said counter to coincide with the time information of said built-in internal clock when it is judged in the judging that the time information of said built-in internal clock is faster than the time information of said counter.

* * * * *